US012360491B2

(12) United States Patent
Shimizu et al.

(10) Patent No.: US 12,360,491 B2
(45) **Date of Patent: *Jul. 15, 2025**

(54) DRUM CARTRIDGE AND DEVELOPING CARTRIDGE CAPABLE OF SUPPRESSING VARIATION IN POSITION OF ELECTRICAL CONTACT SURFACE

(71) Applicant: BROTHER KOGYO KABUSHIKI KAISHA, Nagoya (JP)

(72) Inventors: Takashi Shimizu, Nagoya (JP); Koji Abe, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,666

(22) Filed: Jun. 16, 2023

(65) Prior Publication Data

US 2023/0333509 A1 Oct. 19, 2023

Related U.S. Application Data

(63) Continuation of application No. 17/737,125, filed on May 5, 2022, now Pat. No. 11,899,392, which is a (Continued)

(30) Foreign Application Priority Data

Oct. 14, 2016 (JP) ................................ 2016-202959
Dec. 22, 2016 (JP) ................................ 2016-249651

(51) Int. Cl.
*G03G 21/18* (2006.01)
*G03G 15/08* (2006.01)

(52) U.S. Cl.
CPC ..... *G03G 21/1814* (2013.01); *G03G 15/0863* (2013.01); *G03G 15/0865* (2013.01);
(Continued)

(58) Field of Classification Search
CPC .......... G03G 15/0863; G03G 15/0865; G03G 21/1814; G03G 21/1825; G03G 2215/0697; G03G 2215/085
See application file for complete search history.

(56) References Cited

U.S. PATENT DOCUMENTS 6,097,909 A 8/2000 Watanabe et al.
7,386,253 B2 6/2008 Ishii et al.
(Continued)

FOREIGN PATENT DOCUMENTS

CN 1176406 A 3/1998
CN 1188266 A 7/1998
(Continued)

OTHER PUBLICATIONS

Office Action issued in related Chinese Patent Application No. 202110506244.7, Aug. 3, 2023.
(Continued)

*Primary Examiner* — Hoang X Ngo
(74) *Attorney, Agent, or Firm* — Merchant & Gould P.C.

(57) ABSTRACT

A drum cartridge includes: a drum frame to which a developing cartridge including a storage medium having an electrical contact surface is detachably attachable; a photosensitive drum; a transfer roller; and a conveying roller. The drum is rotatable about a first axis extending in a first direction and positioned at one end portion of the frame in a second direction. The transfer roller is rotatable about a second axis extending in the first direction and in contact with the drum. The conveying roller is rotatable about a third axis extending in the first direction and separated from the transfer roller in the second direction. A first opening of the frame is positioned between the transfer roller and the conveying roller in the second direction. The electrical contact surface is exposed to an outside through the first
(Continued)

opening in a case where the developing cartridge is attached to the frame.

16 Claims, 18 Drawing Sheets

Related U.S. Application Data continuation of application No. 17/395,560, filed on Aug. 6, 2021, now Pat. No. 11,422,501, which is a continuation of application No. 16/692,602, filed on Nov. 22, 2019, now Pat. No. 11,112,747, which is a continuation of application No. 16/438,882, filed on Jun. 12, 2019, now Pat. No. 10,514,655, which is a continuation of application No. 16/168,974, filed on Oct. 24, 2018, now Pat. No. 10,338,520, which is a continuation of application No. 15/472,014, filed on Mar. 28, 2017, now Pat. No. 10,126,704.

(52) U.S. Cl.
CPC . *G03G 21/1825* (2013.01); *G03G 2215/0697* (2013.01); *G03G 2215/085* (2013.01)

(56) References Cited

U.S. PATENT DOCUMENTS

| | | | | |
|---|---|---|---|---|
| 7,512,363 | B2 | 3/2009 | Kamimura | |
| 8,005,392 | B2 * | 8/2011 | Ishii | G03G 21/1652 399/90 |
| 8,233,820 | B2 | 7/2012 | Shiraki et al. | |
| 8,862,013 | B2 | 10/2014 | Kato | |
| 2002/0018666 | A1 | 2/2002 | Noda et al. | |
| 2003/0215261 | A1 | 11/2003 | Karakama et al. | |
| 2005/0105922 | A1 * | 5/2005 | Kawai | G03G 15/556 399/119 |
| 2006/0029418 | A1 | 2/2006 | Ishii et al. | |
| 2006/0029419 | A1 | 2/2006 | Shiraki | |
| 2006/0029420 | A1 | 2/2006 | Ishii et al. | |
| 2006/0029421 | A1 | 2/2006 | Ishii et al. | |
| 2006/0029422 | A1 | 2/2006 | Shiraki | |
| 2006/0029423 | A1 | 2/2006 | Shiraki | |
| 2008/0240774 | A1 | 10/2008 | Fukamachi et al. | |
| 2008/0240778 | A1 | 10/2008 | Ishikawa et al. | |
| 2008/0317499 | A1 † | 12/2008 | Nishimura | |
| 2009/0214249 | A1 | 8/2009 | Lee et al. | |
| 2009/0220250 | A1 | 9/2009 | Funahashi | |
| 2011/0076049 | A1 * | 3/2011 | Kato | G03G 21/1867 399/119 |
| 2011/0158686 | A1 | 6/2011 | Mori | |
| 2015/0125175 | A1 | 5/2015 | Fujii | |
| 2015/0125176 | A1 | 5/2015 | Fujii et al. | |
| 2015/0139694 | A1 * | 5/2015 | Shimizu | G03G 21/1821 399/119 |
| 2015/0192894 | A1 | 7/2015 | Noda et al. | |
| 2015/0261177 | A1 | 9/2015 | Moon et al. | |
| 2016/0139558 | A1 | 5/2016 | Kawakami et al. | |
| 2016/0202629 | A1 | 7/2016 | Fujii | |
| 2016/0252847 | A1 | 9/2016 | Sato et al. | |

FOREIGN PATENT DOCUMENTS

| | | | |
|---|---|---|---|
| CN | 1428668 | A | 7/2003 |
| CN | 1459673 | A | 12/2003 |
| CN | 1605953 | A | 4/2005 |
| CN | 1731293 | A | 2/2006 |
| CN | 101520625 | A | 9/2009 |
| CN | 104428720 | A | 3/2015 |
| CN | 104428721 | A | 3/2015 |
| CN | 104471491 | A | 3/2015 |
| CN | 105607449 | A | 5/2016 |
| JP | 2006-72284 | A | 3/2006 |
| JP | 2006-72285 | A | 3/2006 |
| JP | 2008-249801 | A | 10/2008 |
| JP | 2008-249802 | A | 10/2008 |
| JP | 2010-2701 | A | 1/2010 |
| JP | 2014-16483 | A | 1/2014 |

OTHER PUBLICATIONS

Office Action issued in related Chinese Patent Application No. 202110504262.1, Aug. 2, 2023.
Office Action issued in related Chinese Patent Application No. 202110508081.6, Aug. 2, 2023.
Extended European Search Report issued in related European Patent Application No. 17164056.8, Oct. 2, 2017.
Office Action issued in related European Patent Application No. 17164056.8, Nov. 30, 2018.
Office Action issued in related Chinese Patent Application No. 201710396360.1, Mar. 12, 2020.
Extended European Search Report issued in corresponding European Patent Application No. 19199143.9, Mar. 13, 2020.
Office Action issued in corresponding Japanese Patent Application No. 2016-249651, Oct. 6, 2020.
Notice of Allowance issued in corresponding Chinese Patent Application No. 201710396360.1, Feb. 24, 2021.
Notice of Reasons for Refusal issued in corresponding Japanese Patent Application No. 2021-076700, mailed Feb. 15, 2022.
Office Action (Decision of Refusal) issued in corresponding Japanese Patent Application No. 2021-076700 on Jun. 21, 2022.
Extended European Search Report issued in corresponding European Patent Application No. 22158925.2, Jun. 15, 2022.
Office Action issued in related Chinese Patent Application No. 202110508476.6, Jul. 19, 2023.
Office Action issued in Chinese Patent Application 202110508476.6, Apr. 4, 2024.

* cited by examiner
† cited by third party

DRUM CARTRIDGE AND DEVELOPING CARTRIDGE CAPABLE OF SUPPRESSING VARIATION IN POSITION OF ELECTRICAL CONTACT SURFACE

CROSS REFERENCE TO RELATED APPLICATION

This application is a continuation of U.S. patent application Ser. No. 17/737,125, filed May 5, 2022, now U.S. Pat. No. 11,899,392 which is a continuation of U.S. patent application Ser. No. 17/395,560, filed Aug. 6, 2021, now U.S. Pat. No. 11,422,501, which is a continuation of U.S. patent application Ser. No. 16/692,602, filed Nov. 22, 2019, now U.S. Pat. No. 11,112,747, which is a continuation of U.S. patent application Ser. No. 16/438,882, filed Jun. 12, 2019, now U.S. Pat. No. 10,514,655, which is a continuation of U.S. patent application Ser. No. 16/168,974, filed Oct. 24, 2018, now U.S. Pat. No. 10,338,520, which is a continuation of U.S. patent application Ser. No. 15/472,014 filed Mar. 28, 2017, now U.S. Pat. No. 10,126,704, which further claim priority from Japanese Patent Application Nos. 2016-202959 filed Oct. 14, 2016 and 2016-249651 filed Dec. 22, 2016. The entire contents of each of these applications is incorporated herein by reference.

TECHNICAL FIELD

The present disclosure relates to a drum cartridge and a developing cartridge.

BACKGROUND

A drum cartridge including a drum frame and a developing cartridge including a developing roller are well known in the art. One such developing cartridge also includes a storage medium having an electrical contact surface. The developing cartridge is attached to the drum frame by inserting the developing cartridge into the drum frame and pivotally moving the developing cartridge about the developing roller relative to the drum frame.

SUMMARY

In a case where the developing cartridge is attached to the drum frame in this way, the position of the electrical contact surface of the storage medium is generally determined by the position of the developing roller.

The electrical contact surface of the storage medium is positioned distant from the developing roller.

Variations in the position of the electrical contact surface are greater as the electrical contact surface is separated farther from the developing roller serving as a positioning reference. Thus, positional variations of the electrical contact surface may arise during manufacturing of the developing cartridges. Consequently, there is greater potential for variations in the position of the electrical contact surface relative to the drum frame in a case where the developing cartridge is attached to the drum frame.

In view of the foregoing, it is an object of the present disclosure to provide a drum cartridge and a developing cartridge capable of suppressing variations in a position of an electrical contact surface relative to the drum frame in a case where the developing cartridge is attached to the drum frame.

In order to attain the above and other objects, according to one aspect, the disclosure provides a drum cartridge including: a drum frame; a photosensitive drum; a transfer roller; and a conveying roller. A developing cartridge is detachably attachable to the drum frame. The developing cartridge includes a storage medium having an electrical contact surface. The drum frame has a first opening. The photosensitive drum is rotatable about a first axis extending in a first direction. The photosensitive drum is positioned at a first end portion of the drum frame in a second direction. The transfer roller is rotatable about a second axis extending in the first direction. The transfer roller is in contact with a surface of the photosensitive drum. The conveying roller is rotatable about a third axis extending in the first direction. The conveying roller is separated from the transfer roller in the second direction. The first opening is positioned between the transfer roller and the conveying roller in the second direction. The electrical contact surface is exposed to an outside of the drum frame through the first opening in a case where the developing cartridge is attached to the drum frame.

According to another aspect, the disclosure provides a developing cartridge including: a casing; a developing roller; an agitator; a developing electrode; and a storage medium. The casing is configured to accommodate toner therein. The casing has a first end portion and a second end portion in a first direction. The casing further has a third end portion and a fourth end portion in a second direction. The developing roller is rotatable about a developing-roller axis extending in the first direction. The developing roller is positioned at the third end portion of the casing. The agitator is rotatable about an agitator axis extending in the first direction. The agitator is separated from the developing roller in the second direction. The developing electrode for supplying electric power to the developing roller is positioned at the second end portion of the casing. The developing electrode is positioned between the developing roller and the agitator in the second direction. The storage medium has an electrical contact surface. The electrical contact surface is positioned at the first end portion of the casing. The electrical contact surface is positioned between the developing roller and the agitator in the second direction.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1:
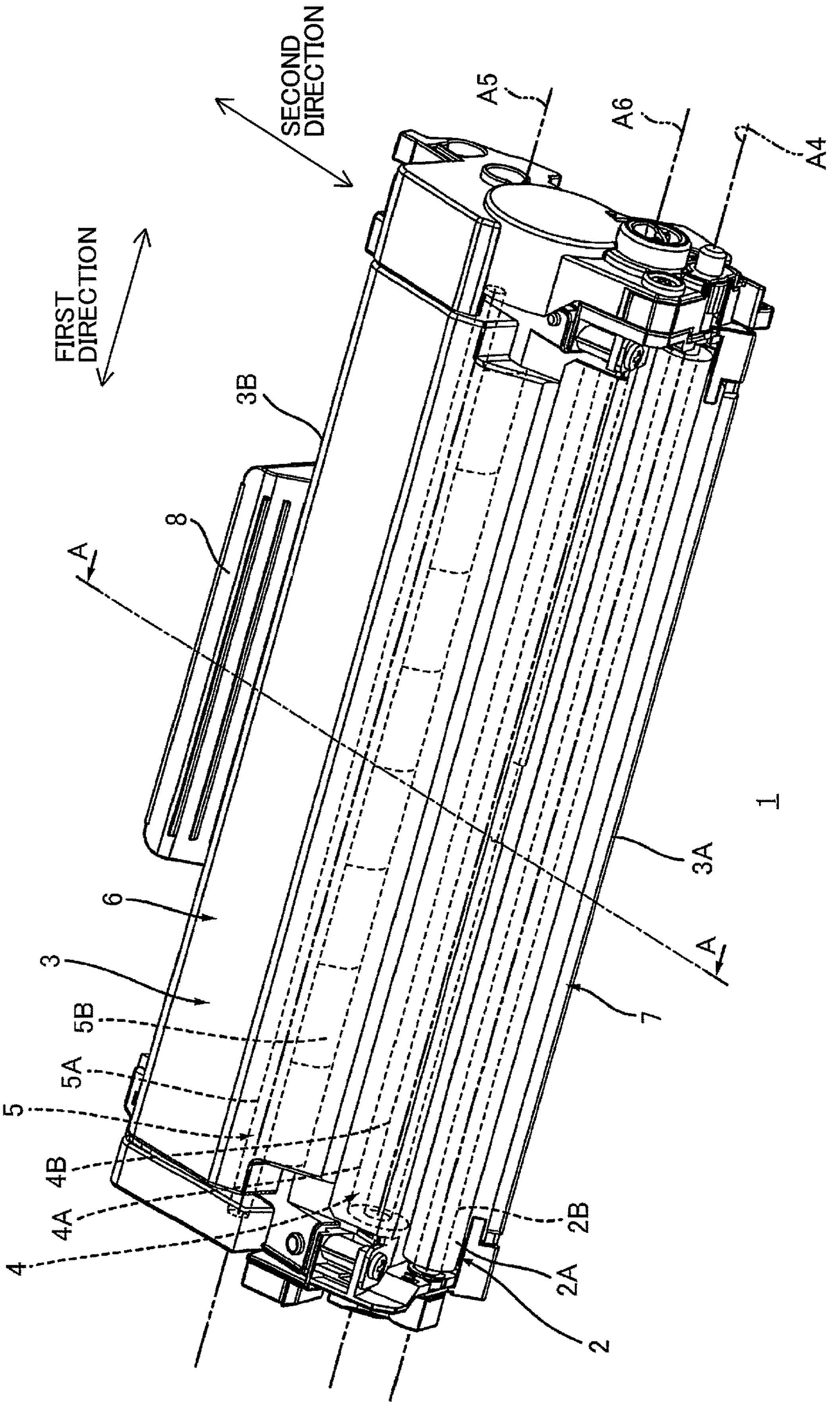
FIG. 1 is a perspective view of a developing cartridge according to one embodiment.

A developing cartridge 1 and a drum cartridge 41 according to one embodiment will be described with reference to the accompanying drawings, wherein like parts and components are designated by the same reference numerals to avoid duplicating description. First, the developing cartridge 1 will be described. Then, the drum cartridge 41 will be described.

1. Overall Structure of Developing Cartridge 1

Figure 10:
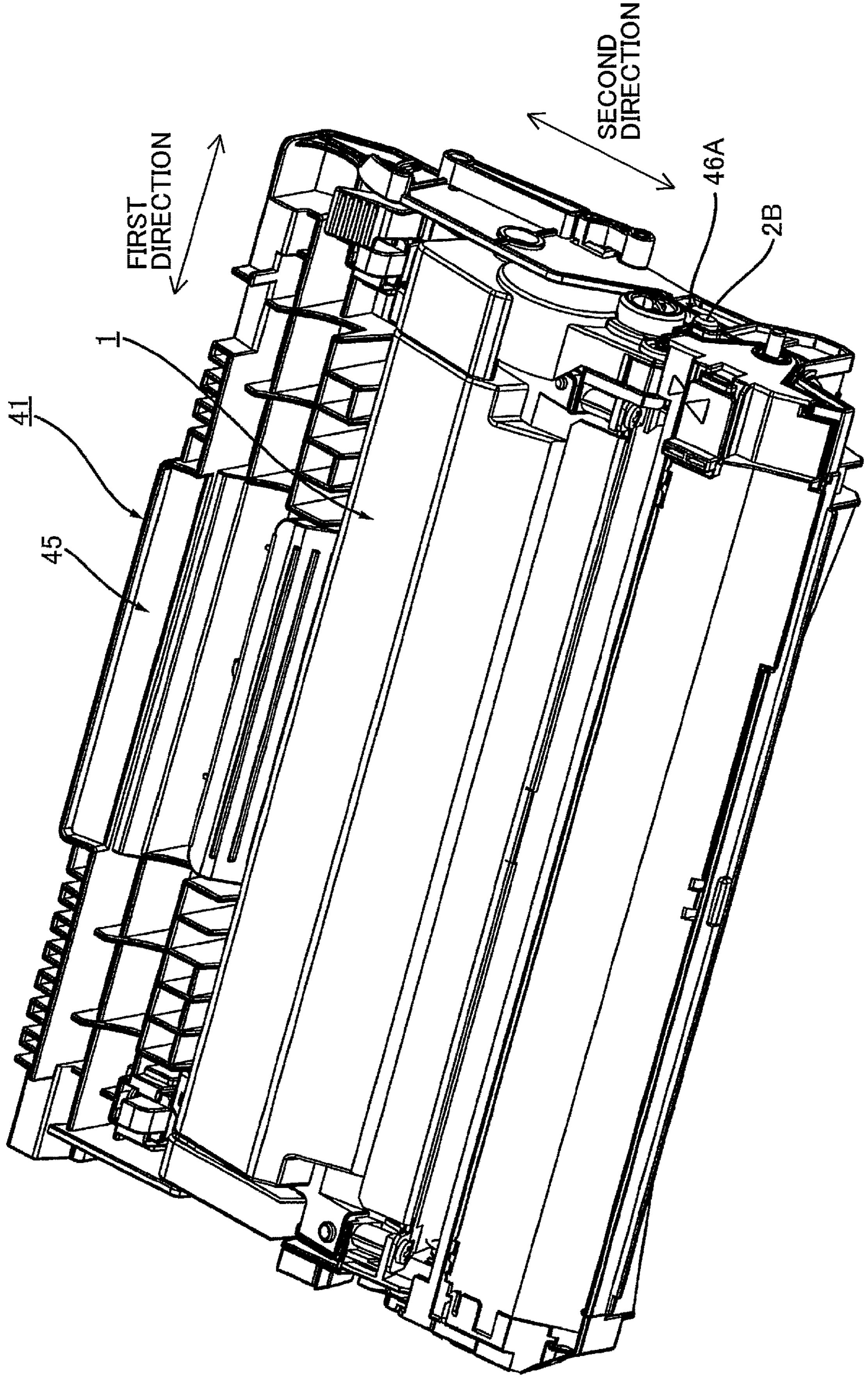
FIG. 10 is a perspective view of the drum cartridge to which the developing cartridge has been attached.

FIG. 1 illustrates the developing cartridge 1. The developing cartridge 1 is attached to a drum frame 45 of the drum cartridge 41 described later, as illustrated in FIG. 10, and then attached together with the drum cartridge 41 to an image forming apparatus (not illustrated).

The developing cartridge 1 is detachably attachable to the drum frame 45 of the drum cartridge 41 described later. The developing cartridge 1 accommodates toner. The developing cartridge 1 can supply toner to a surface of a photosensitive drum 42 described later (see FIG. 8). In a case where an electrostatic latent image is formed on the surface of the photosensitive drum 42, the toner supplied to the surface of the photosensitive drum 42 develops the electrostatic latent image. By developing the electrostatic latent image, a toner image is formed on the surface of the photosensitive drum 42. Next, a structure of the developing cartridge 1 will be described in detail.

As illustrated in FIG. 1, the developing cartridge 1 includes a developing roller 2, a casing 3, a supply roller 4, and an agitator 5.

1.1 Developing Roller 2

The developing roller 2 is rotatable about a developing-roller axis A4 extending in a first direction. In a case where the developing cartridge 1 is attached to the drum cartridge 41, the developing roller 2 contacts the surface of the photosensitive drum 42. The developing roller 2 can supply toner in the casing 3 to the photosensitive drum 42.

The developing roller 2 is disposed at one end portion 3A (i.e. a third end portion) of the casing 3 in a second direction. The developing roller 2 extends in the first direction. The developing roller 2 has a first end portion and a second end portion in the first direction. The first end portion of the developing roller 2 in the first direction is positioned closer to a plurality of electrical contact surfaces 31A described later (see FIG. 6) than the second end portion of the developing roller 2 in the first direction is to the plurality of electrical contact surfaces 31A.

Specifically, the developing roller 2 includes a developing-roller body 2A, and a developing-roller shaft 2B. The developing-roller body 2A extends in the first direction. The developing-roller shaft 2B is oriented along the developing-roller axis A4. That is, the developing-roller shaft 2B extends in the first direction. The developing-roller body 2A is rotatable together with the developing-roller shaft 2B. The developing-roller shaft 2B has a first end portion and a second end portion in the first direction. The first end portion of the developing-roller shaft 2B in the first direction is positioned closer to the plurality of electrical contact surfaces 31A (see FIG. 6) than the second end portion of the developing-roller shaft 2B in the first direction is to the plurality of electrical contact surfaces 31A.

1. 2 Casing 3

The casing 3 is configured to accommodate toner therein. The casing 3 has one end portion and the other end portion in the first direction. The one end portion of the casing 3 in the first direction will be referred to as a first end portion 3E, while the other end portion of the casing 3 in the first direction will be referred to as a second end portion 3F. In addition, the casing 3 has one end portion and the other end portion in the second direction. The one end portion of the casing 3 in the second direction will be referred to as a third end portion 3A, while the other end portion of the casing 3 in the second direction will be referred to as a fourth end portion 3B. The second direction is a direction in which the developing roller 2 and the agitator 5 are aligned. The second direction crosses the first direction. More specifically, the second direction is orthogonal to the first direction. The third end portion 3A of the casing 3 is positioned closer to the developing roller 2 than the fourth end portion 3B of the casing 3 is to the developing roller 2 in the second direction. A handle 8 is positioned at the fourth end portion 3B of the casing 3.

Figure 2:
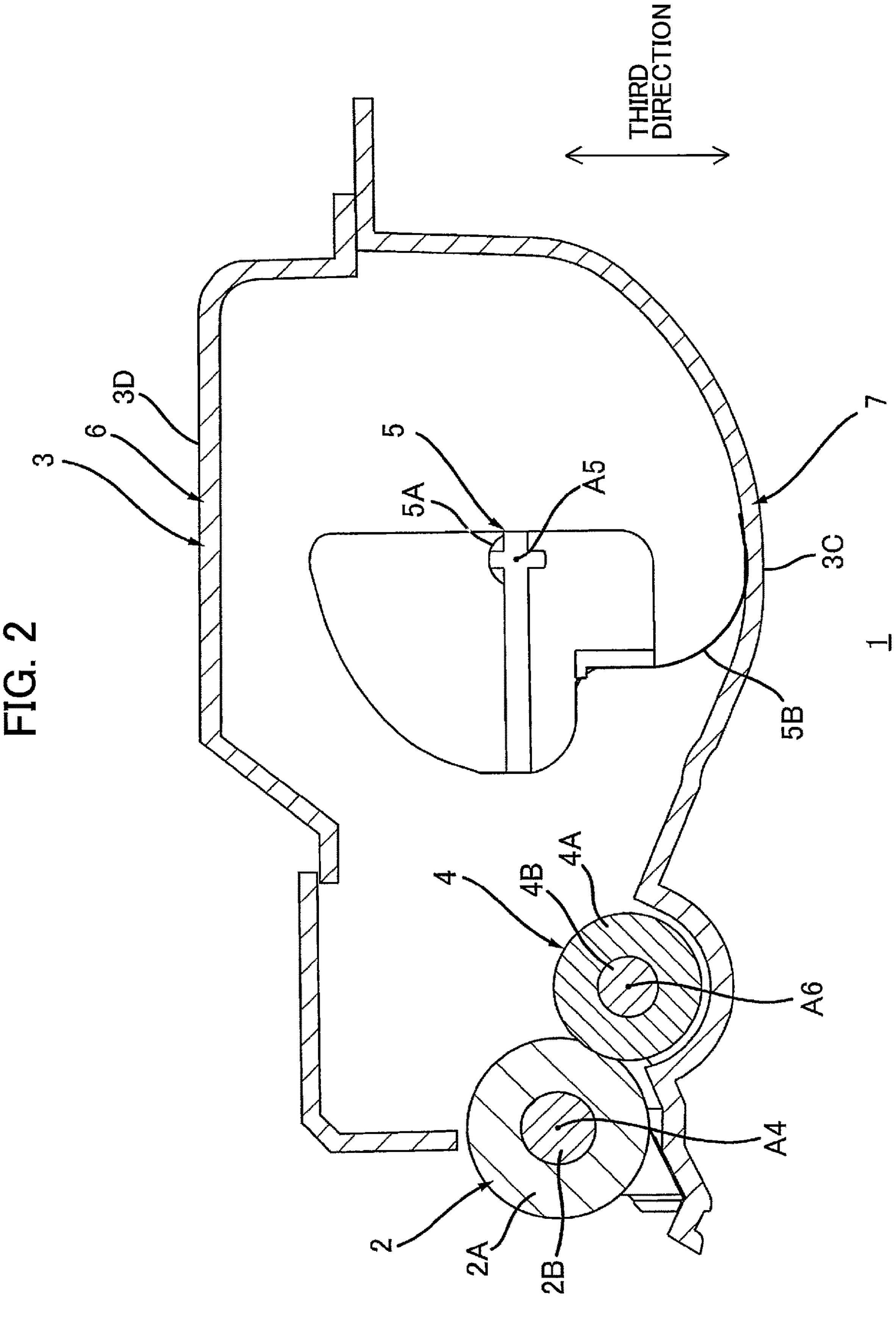
FIG. 2 is a schematic cross-sectional view of the developing cartridge taken along a line A-A in FIG. 1.

Next, the casing 3 will be described in detail with reference to FIG. 2. As illustrated in FIG. 2, the casing 3 includes a first frame 6, and a second frame 7. The second frame 7 confronts the first frame 6 in a third direction. The second frame 7 is joined with the first frame 6. Together the first frame 6 and the second frame 7 define an interior space of the casing 3. Hereinafter, one end portion of the casing 3 in the third direction will be referred to as a fifth end portion 3C, while the other end portion of the casing 3 in the third direction will be referred to as a sixth end portion 3D. The first frame 6 includes the sixth end portion 3D of the casing 3. The second frame 7 includes the fifth end portion 3C of the casing 3. Hence, the casing 3 has the fifth end portion 3C and the sixth end portion 3D with respect to the third direction. The fifth end portion 3C of the casing 3 is positioned closer to the plurality of electrical contact surfaces 31A than the sixth end portion 3D of the casing 3 is to the plurality of electrical contact surfaces 31A. The developing roller 2 is mounted at the second frame 7 of the casing 3.

1.3 Supply Roller 4

As illustrated in FIG. 1, the supply roller 4 is rotatable about a supply-roller axis A6 extending in the first direction. The supply roller 4 is a roller for supplying toner in the casing 3 to the developing roller 2. A surface of the supply roller 4 contacts a surface of the developing roller 2.

The supply roller 4 is positioned between the developing roller 2 and the agitator 5 in the second direction. The supply roller 4 extends in the first direction. The supply roller 4 has a first end portion and a second end portion in the first direction. The first end portion of the supply roller 4 in the first direction is positioned closer to the plurality of electrical contact surfaces 31A (see FIG. 6) than the second end portion of the supply roller 4 in the first direction is to the plurality of electrical contact surfaces 31A. Specifically, the supply roller 4 includes a supply-roller body 4A, and a supply-roller shaft 4B.

The supply-roller body 4A extends in the first direction. The supply-roller shaft 4B is oriented along the supply-roller axis A6. That is, the supply-roller shaft 4B extends in the first direction. The supply-roller body 4A is rotatable together with the supply-roller shaft 4B. The supply-roller shaft 4B includes a first end portion and a second end portion in the first direction. The first end portion of the supply-roller shaft 4B in the first direction is positioned closer to the plurality of electrical contact surfaces 31A (see FIG. 6) than the second end portion of the supply-roller shaft 4B in the first direction is to the plurality of electrical contact surfaces 31A.

1.4 Agitator 5

The agitator 5 can agitate toner in the casing 3. The agitator 5 can also convey toner in the casing 3 toward the developing roller 2 in the second direction. The agitator 5 is rotatable about an agitator axis A5 extending in the first direction. The agitator 5 is separated from the developing roller 2 in the second direction. The agitator 5 is positioned inside the casing 3. The agitator 5 includes an agitator shaft 5A, and a plurality of blades 5B.

2. Detailed Description of Developing Cartridge 1

Figure 3:
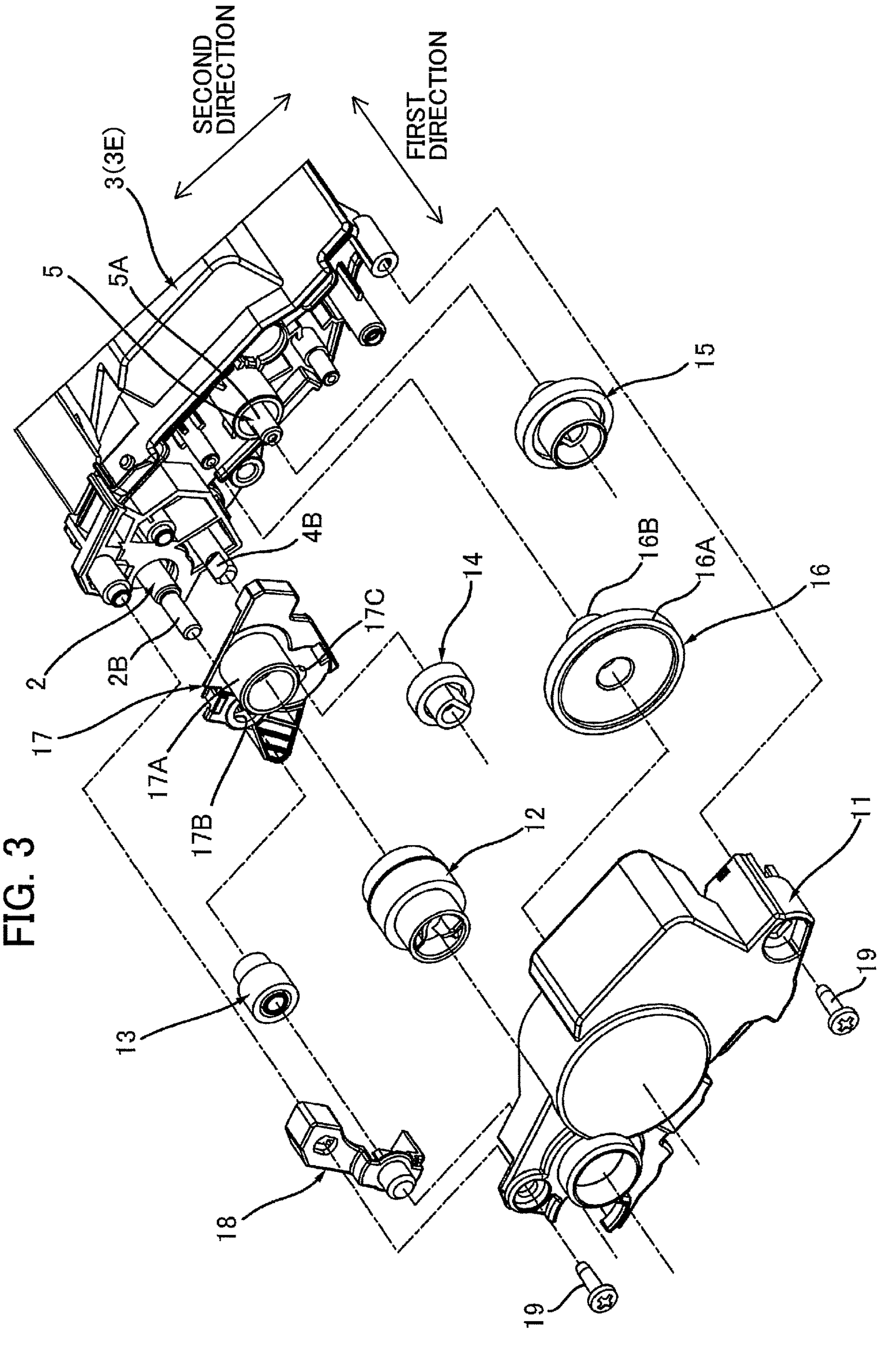
FIG. 3 is an exploded perspective view of one end portion of the developing cartridge in FIG. 1.

2.1 Detailed Description of One End Portion of Developing Cartridge 1 in First Direction Next, one end portion of the developing cartridge 1 in the first direction will be described in detail with reference to FIG. 3. As illustrated in FIG. 3, the developing cartridge 1 includes a gear cover 11, a coupling 12, a developing gear 13, a supply gear 14, an agitator gear 15, an idle gear 16, a first bearing member 17, and a cap 18. The gear cover 11, the coupling 12, the developing gear 13, the supply gear 14, the agitator gear 15, the idle gear 16, the first bearing member 17, and the cap 18 are disposed at the one end portion of the casing 3 in the first direction, that is, at the first end portion 3E of the casing 3. More specifically, the gear cover 11, the coupling 12, the developing gear 13, the supply gear 14, the agitator gear 15, the idle gear 16, the first bearing member 17, and the cap 18 are positioned at an outer surface of the first end portion 3E of the casing 3.

2.1.1 Gear Cover 1

As illustrated in FIG. 3, the gear cover 11 covers at least a portion of a circumference of the developing gear 13. The gear cover 11 is attached to the first end portion 3E of the casing 3. Specifically, the gear cover 11 is attached to the outer surface of the first end portion 3E of the casing 3. More specifically, the gear cover 11 is fixed to the outer surface of the first end portion 3E of the casing 3 by screws 19.

Note that the term "gear" in the present specification is not limited to a member having gear teeth that transmits rotational force through the gear teeth, but may include a member that transmits rotational force through friction. In the case of members that transmit rotational force through friction, the addendum circle of the gear is defined as the circle passing along the friction-producing surface of the gear.

2.1.2 Coupling 12

The coupling 12 is rotatable about an axis extending in the first direction. The coupling 12 can rotate in response to a drive force. That is, the coupling 12 can receive a drive force from the image forming apparatus. The coupling 12 can rotate by engaging with a drive member (not illustrated) of the image forming apparatus. The coupling 12 has a recessed portion recessed in the first direction. The recessed portion of the coupling 12 can receive and engage with the drive member. Specifically, the recessed portion of the coupling 12 can engage with the drive member of the image forming apparatus to receive a drive force from the drive member.

2.1.3 Developing Gear 13

The developing gear 13 is mounted to the first end portion of the developing roller 2 in the first direction. Specifically, the developing gear 13 is mounted to the first end portion of the developing-roller shaft 2B in the first direction. The developing gear 13 is rotatable together with the developing roller 2. The developing gear 13 is also rotatable together with the coupling 12.

2.1.4 Supply Gear 14

The supply gear 14 is mounted to the first end portion of the supply-roller shaft 4B of the supply roller 4 in the first direction. The supply gear 14 is rotatable together with the coupling 12.

2.1.5 Agitator Gear 15

The agitator gear 15 is mounted to a first end portion of the agitator shaft 5A of the agitator 5 in the first direction. The agitator gear 15 is rotatable together with the agitator 5 in response to rotation of the coupling 12.

2.1.6 Idle Gear 16

The idle gear 16 includes a large-diameter portion 16A engaging with gear teeth of the coupling 12, and a small-diameter portion 16B engaging with gear teeth of the agitator gear 15. The idle gear 16 is rotatably supported by a shaft (not illustrated) of the gear cover 11. The idle gear 16 is configured to transmit rotation of the coupling 12 to the agitator gear 15 while reducing the speed of rotation. The large-diameter portion 16A is separated farther from the casing 3 than the small-diameter portion 16B is from the casing 3 in the first direction.

2.1.7 First Bearing Member 17

The first bearing member 17 supports the coupling 12, the developing gear 13, and the supply gear 14. The first bearing member 17 includes a boss 17A for supporting the coupling 12. The boss 17A has a cylindrical shape that extends in the first direction. The first bearing member 17 has a hole 17B into which the developing-roller shaft 2B is inserted, and a hole 17C into which the supply-roller shaft 4B is inserted. By inserting the first end portion of the developing-roller shaft 2B in the first direction into the hole 17B, the first bearing member 17 is attached to the first end portion of the developing-roller shaft 2B in the first direction. By inserting the first end portion of the supply-roller shaft 4B in the first direction into the hole 17C, the first bearing member 17 is attached to the first end portion of the supply-roller shaft 4B in the first direction.

2.1.8 Cap 18

The cap 18 covers the first end portion of the developing-roller shaft 2B in the first direction. Note that the gear cover 11 and the cap 18 may be formed of different types of resin.

Figure 4:
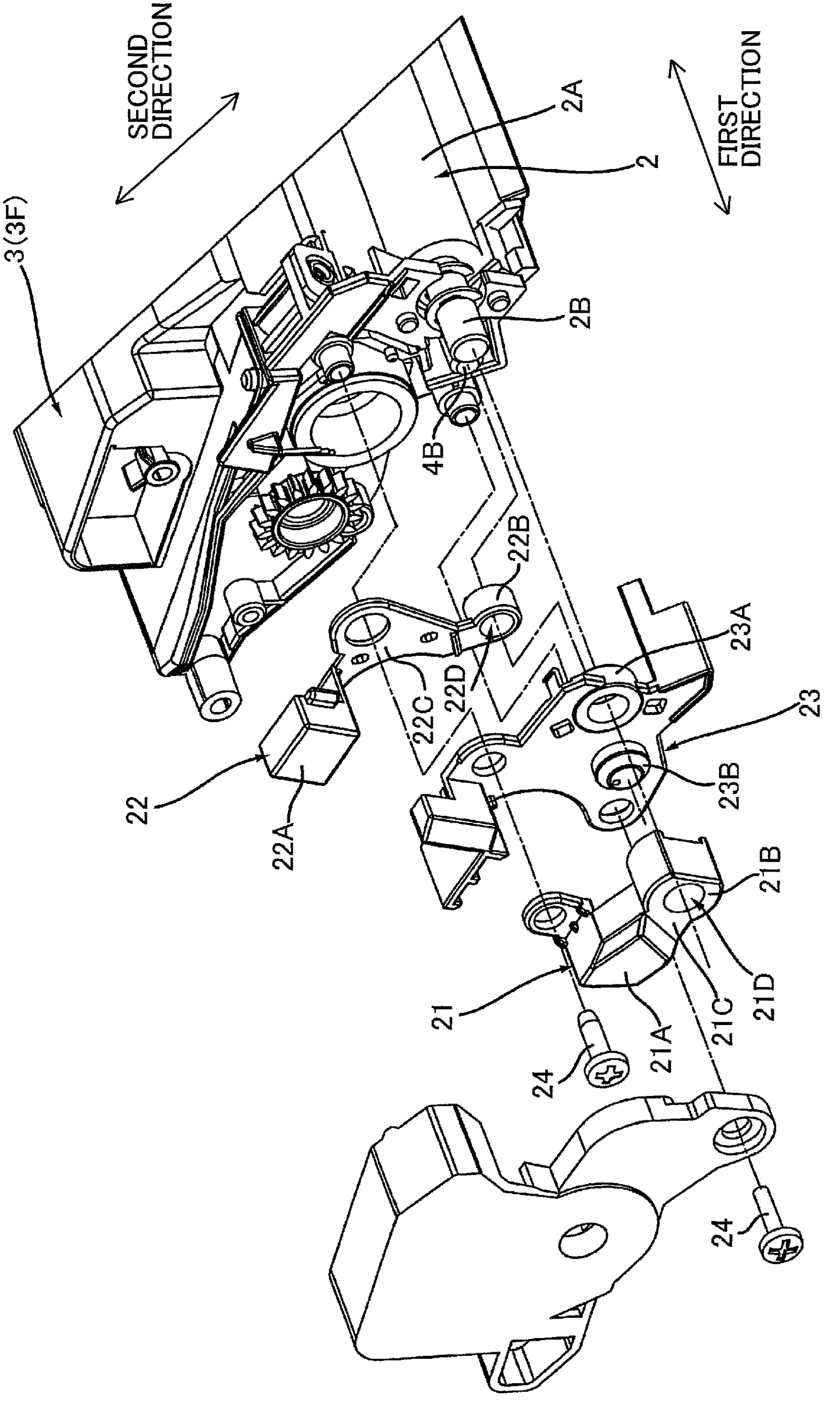
FIG. 4 is an exploded perspective view of another end portion of the developing cartridge in FIG. 1.

2.2 Detailed Description of Other End Portion of Developing Cartridge 1 in First Direction Next, the other end portion of the developing cartridge 1 in the first direction will be described in detail with reference to FIGS. 4 and 5. As illustrated in FIG. 4, the developing cartridge 1 includes a developing electrode 21, a supply electrode 22, and a second bearing member 23. The developing electrode 21, the supply electrode 22, and the second bearing member 23 are disposed at the other end portion of the casing 3 in the first direction, that is, at the second end portion 3F of the casing 3. That is, the developing electrode 21 and the supply electrode 22 are positioned at the second end portion 3F of the casing 3. More specifically, the developing electrode 21, the supply electrode 22, and the second bearing member 23 are positioned at an outer surface of the second end portion 3F of the casing 3. Hence, the developing electrode 21 and the supply electrode 22 are positioned at the outer surface of the second end portion 3F of the casing 3.

2.2.1 Developing Electrode 21

The developing electrode 21 is an electrode for supplying electric power to the developing roller 2. Specifically, the developing electrode 21 is configured to supply electric power to the developing-roller shaft 2B. As illustrated in FIG. 5, the developing electrode 21 is positioned between the developing roller 2 and the agitator 5 in the second direction. The developing electrode 21 has a portion separated from the developing-roller shaft 2B in the second direction. As illustrated in FIG. 4, the developing electrode 21 has a portion separated from an end of the developing-roller shaft 2B in the first direction. Specifically, the developing electrode 21 protrudes in the first direction such that a distal end of the developing electrode 21 is separated farther from the casing 3 than the end of the developing-roller shaft 2B in the first direction is from the casing 3. The developing electrode 21 is formed of an electrically conductive resin, for example.

The developing electrode 21 has a developing contact surface 21A. The developing contact surface 21A is in contact with an electrode in the image forming apparatus in a case where the developing cartridge 1 is attached to the image forming apparatus. The developing contact surface 21A extends in the second direction and the third direction. The developing contact surface 21A is separated from the developing-roller shaft 2B in the second direction. The developing contact surface 21A is also separated from the end of the developing-roller shaft 2B in the first direction.

The developing electrode 21 also includes a developing contact 21B, and a coupling portion 21C. The developing contact 21B contacts the developing-roller shaft 2B. The coupling portion 21C is electrically connected to the developing contact 21B and the developing contact surface 21A.

The developing contact 21B has a contact hole 21D. The second end portion of the developing-roller shaft 2B in the first direction is inserted into the contact hole 21D. Accordingly, the developing contact 21B functions as a bearing for the developing-roller shaft 2B. In other words, the developing electrode 21 includes a developing-roller bearing attached to the second end portion of the developing-roller shaft 2B in the first direction. Thus, the developing cartridge 1 includes the developing-roller bearing. The contact hole 21D is preferably a circular-shaped hole. In a case where the developing-roller shaft 2B is inserted into the contact hole 21D, the developing contact 21B is in contact with the second end portion of the developing-roller shaft 2B in the first direction. Specifically, the developing contact 21B is in contact with an outer circumferential surface of the second end portion of the developing-roller shaft 2B in the first direction in case where the developing-roller shaft 2B is inserted into the contact hole 21D. Accordingly, the developing contact 21B is attached to the second end portion of the developing-roller shaft 2B in the first direction. That is, the developing contact 21B is attached to the second end portion of the developing roller 2 in the first direction. Further, the developing contact 21B is aligned with the developing contact surface 21A in the second direction. Accordingly, the developing contact surface 21A is separated from the developing-roller shaft 2B in the second direction.

The developing contact surface 21A of the developing electrode 21 is in contact with the electrode in the image forming apparatus in a case where the developing cartridge 1 is attached to the image forming apparatus. Accordingly, in a case where receiving electric power from the image forming apparatus, the developing electrode 21 can supply electric power to the developing roller 2.

2.2.2 Supply Electrode 22

The supply electrode 22 is an electrode for supplying electric power to the supply roller 4. Specifically, the supply electrode 22 is configured to supply electric power to the supply-roller shaft 4B. As illustrated in FIG. 5, the supply electrode 22 is positioned between the developing electrode 21 and the agitator 5 in the second direction. The supply electrode 22 has a portion separated from the supply-roller shaft 4B in the second direction. As illustrated in FIG. 4, the supply electrode 22 is separated from the end of the developing-roller shaft 2B in the first direction. Specifically, the supply electrode 22 protrudes in the first direction such that a distal end of the supply electrode 22 is separated farther from the casing 3 than the end of the developing-roller shaft 2B in the first direction is from the casing 3. The supply electrode 22 is formed of an electrically conductive resin, for example.

The supply electrode 22 has a supply contact surface 22A. The supply contact surface 22A is in contact with an electrode in the image forming apparatus in a case where the developing cartridge 1 is attached to the image forming apparatus. The supply contact surface 22A extends in the second direction and the third direction. The supply contact surface 22A is separated from the supply-roller shaft 4B in the second direction. Further, the supply contact surface 22A is separated from the end of the supply-roller shaft 4B in the first direction.

The supply electrode 22 also includes a supply contact 22B, and a coupling portion 22C. The supply contact 22B contacts the supply-roller shaft 4B. The coupling portion 22C is electrically connected to the supply contact surface 22A and the supply contact 22B.

The supply contact 22B has a contact hole 22D. The second end portion of the supply-roller shaft 4B in the first direction is inserted into the contact hole 22D. Accordingly, the supply contact 22B functions as a bearing for the supply-roller shaft 4B. In other words, the supply electrode 22 includes a supply-roller bearing attached to the second end portion of the supply-roller shaft 4B in the first direction. Thus, the developing cartridge 1 includes the supply-roller bearing. The contact hole 22D is preferably a circular-shaped hole. In a case where the supply-roller shaft 4B is inserted into the contact hole 22D, the supply contact 22B is in contact with the second end portion of the supply-roller shaft 4B in the first direction. Specifically, the supply contact 22B is in contact with an outer circumferential surface of the second end portion of the supply-roller shaft 4B in the first direction in a case where the supply-roller shaft 4B is inserted into the contact hole 22D. That is, the supply contact 22B is attached to the second end portion of the supply-roller shaft 4B in the first direction. Further, the supply contact 22B is aligned with the supply contact surface 22A in the second direction. Accordingly, the supply contact surface 22A is separated from the supply-roller shaft 4B in the second direction.

The electrode in the image forming apparatus is in contact with the supply contact surface 22A of the supply electrode 22 in a case where the developing cartridge 1 is attached to the image forming apparatus. Accordingly, in a case where receiving electric power from the image forming apparatus, the supply electrode 22 can supply electric power to the supply roller 4.

2.2.3 Second Bearing Member 23

The second bearing member 23 includes a first support portion 23A, and a second support portion 23B. The first support portion 23A rotatably supports the developing-roller shaft 2B. The second support portion 23B rotatably supports the supply-roller shaft 4B. While supporting the developing-roller shaft 2B and the supply-roller shaft 4B, the second bearing member 23 is fixed to the outer surface of the second end portion 3F of the casing 3.

The second bearing member 23 is fixed together with the developing electrode 21 and the supply electrode 22 to the outer surface of the second end portion 3F of the casing 3 by screws 24.

Figure 6:
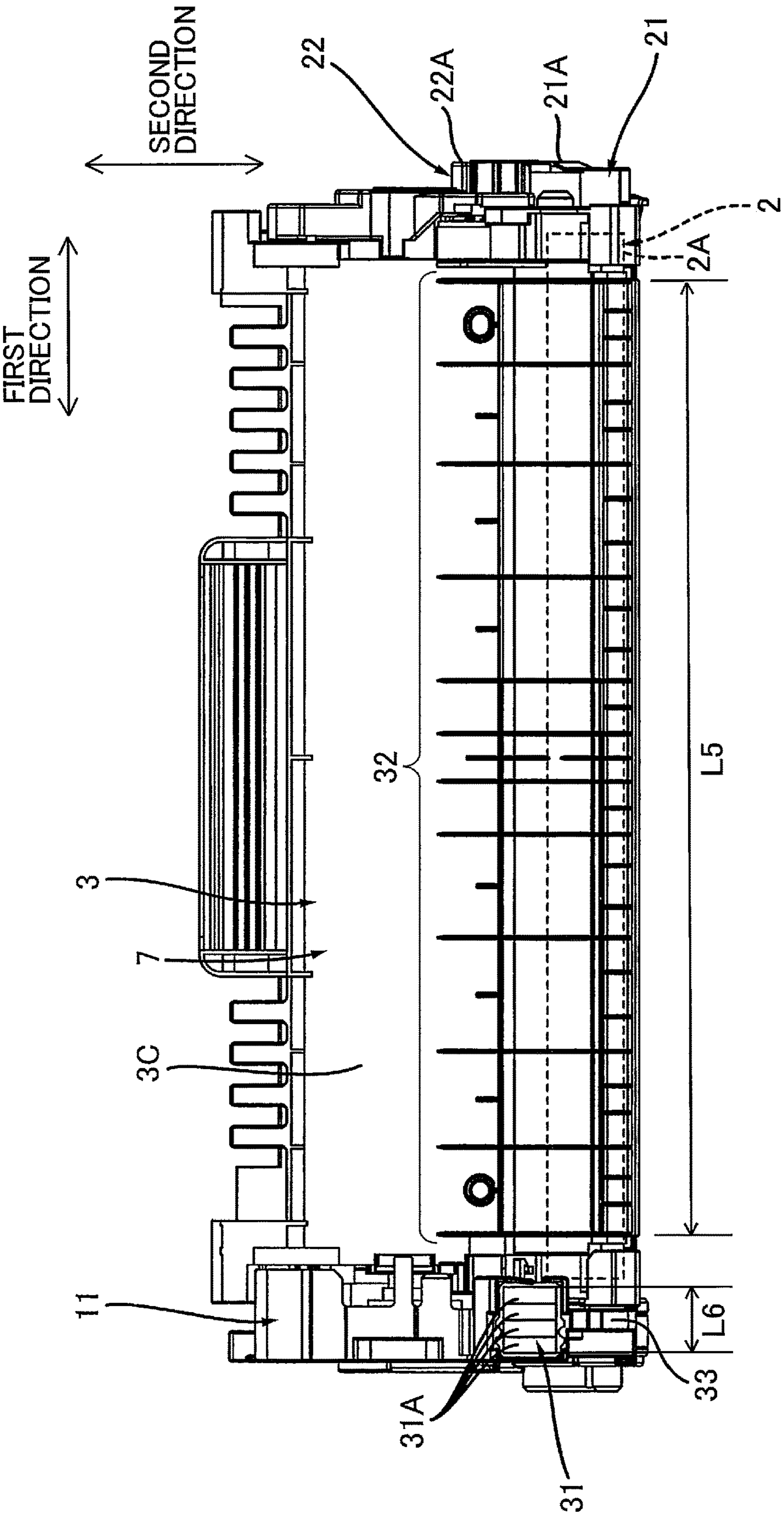
FIG. 6 is a side view of the developing cartridge in FIG. 1, in which a storage medium having a plurality of electrical contact surfaces is illustrated.
Figure 7A:
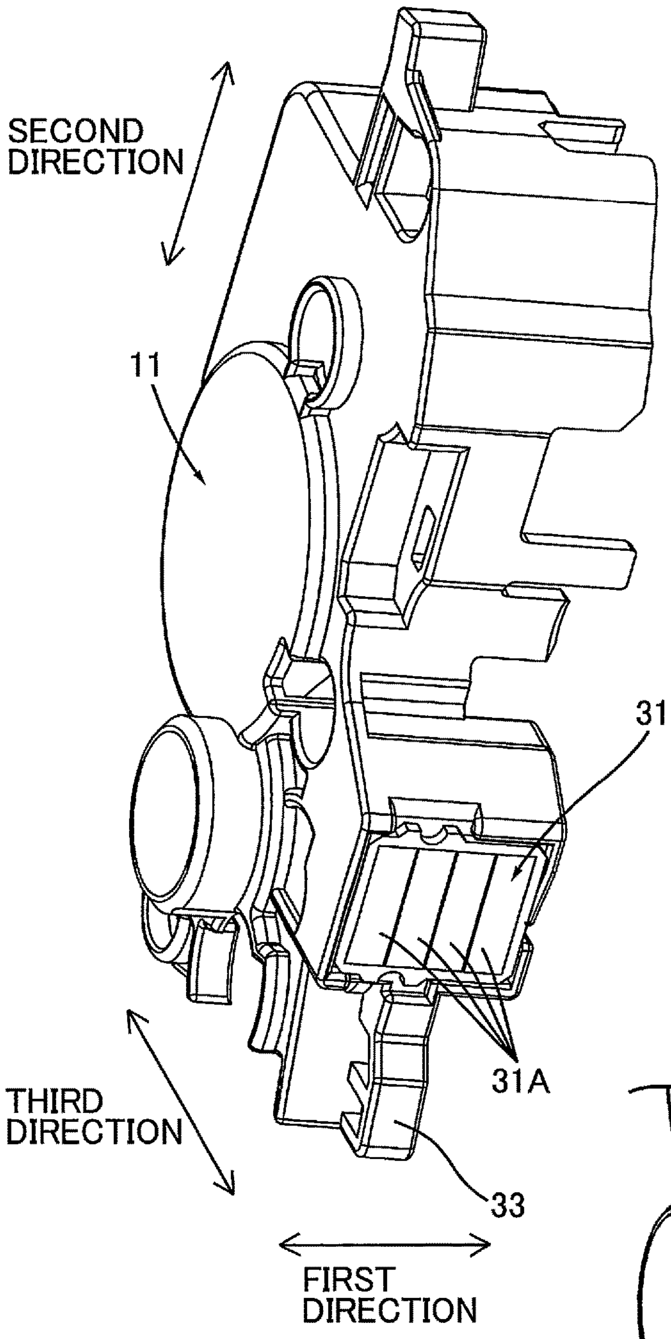
FIG. 7A is a perspective view of a gear cover of the developing cartridge in FIG. 6.

2.3 Detailed Description of One End Portion of Developing Cartridge 1 in Third Direction Next, one end portion of the developing cartridge 1 in the third direction will be described in detail with reference to FIGS. 6, 7A, and 7B. The developing cartridge 1 includes a storage medium 31, and a plurality of ribs 32.

2.3.1 Storage Medium 31

The storage medium 31 is an integrated circuit. The storage medium 31 has at least one electrical contact surface 31A. Note that the electrical contact surface 31A may be singular or plural. In the present embodiment, the storage medium 31 has a plurality of, that is, four, electrical contact surfaces 31A. The four electrical contact surfaces 31A are arrayed in the first direction.

Figure 7B:
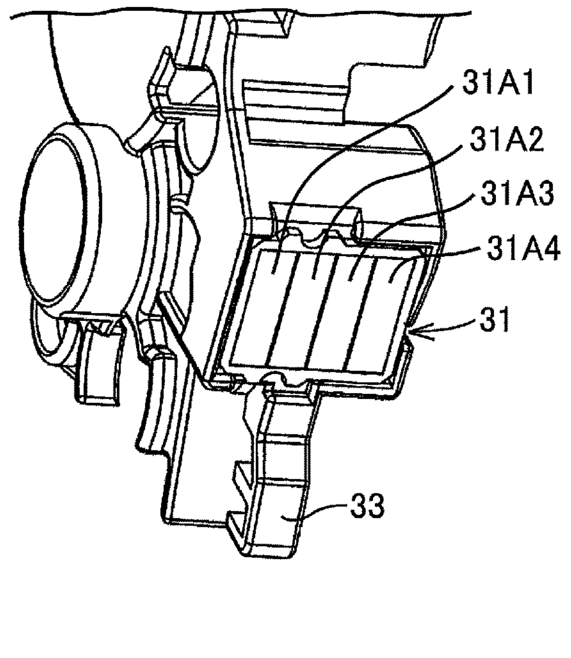
FIG. 7B is an enlarged perspective view of the plurality of electrical contact surfaces in FIG. 7A.

Specifically, as illustrated in FIG. 7B, the storage medium 31 includes a SIO (data) terminal 31A1, a GND (ground) terminal 31A2, a SCK (serial clock) terminal 31A3, and a PWR (power) terminal 31A4. Hence, a surface of the SIO (data) terminal 31A1 constitutes one of the four electrical contact surfaces 31A, a surface of the GND (ground) terminal 31A2 constitutes another of the four electrical contact surfaces 31A, a surface of the SCK (serial clock) terminal 31A3 constitutes another of the four electrical contact surfaces 31A, and a surface of the PWR (power) terminal 31A4 constitutes the other of the four electrical contact surfaces 31A.

In the present embodiment, the four electrical contact surfaces 31A are arrayed in the first direction such that the SIO (data) terminal 31A1, the GND (ground) terminal 31A2, the SCK (serial clock) terminal 31A3, and the PWR (power) terminal 31A4 are arrayed in the first direction in this order.

However, the SIO (data) terminal 31A1, the GND (ground) terminal 31A2, the SCK (serial clock) terminal 31A3, and the PWR (power) terminal 31A4 may be arrayed in the first direction in any order.

For example, the four electrical contact surfaces 31A are arrayed in the first direction such that the SIO (data) terminal 31A1, the GND (ground) terminal 31A2, the PWR (power) terminal 31A4, and the SCK (serial clock) terminal 31A3 are arrayed in the first direction in this order.

Further, for example, the four electrical contact surfaces 31A are arrayed in the first direction such that the SIO (data) terminal 31A1, the SCK (serial clock) terminal 31A3, the GND (ground) terminal 31A2, and the PWR (power) terminal 31A4 are arrayed in the first direction in this order.

Further, for example, the four electrical contact surfaces 31A are arrayed in the first direction such that the SIO (data) terminal 31A1, the SCK (serial clock) terminal 31A3, the PWR (power) terminal 31A4, and the GND (ground) terminal 31A2 are arrayed in the first direction in this order.

Further, for example, the four electrical contact surfaces 31A are arrayed in the first direction such that the SIO (data) terminal 31A1, the PWR (power) terminal 31A4, the GND (ground) terminal 31A2, and the SCK (serial clock) terminal 31A3 are arrayed in the first direction in this order.

Further, for example, the four electrical contact surfaces 31A are arrayed in the first direction such that the SIO (data) terminal 31A1, the PWR (power) terminal 31A4, the SCK (serial clock) terminal 31A3, and the GND (ground) terminal 31A2 are arrayed in the first direction in this order.

Further, for example, the four electrical contact surfaces 31A are arrayed in the first direction such that the GND (ground) terminal 31A2, the SIO (data) terminal 31A1, the SCK (serial clock) terminal 31A3, and the PWR (power) terminal 31A4 are arrayed in the first direction in this order.

Further, for example, the four electrical contact surfaces 31A are arrayed in the first direction such that the GND (ground) terminal 31A2, the SIO (data) terminal 31A1, the PWR (power) terminal 31A4, and the SCK (serial clock) terminal 31A3 are arrayed in the first direction in this order.

Further, for example, the four electrical contact surfaces 31A are arrayed in the first direction such that the GND (ground) terminal 31A2, the SCK (serial clock) terminal 31A3, the SIO (data) terminal 31A1, and the PWR (power) terminal 31A4 are arrayed in the first direction in this order.

Further, for example, the four electrical contact surfaces 31A are arrayed in the first direction such that the GND (ground) terminal 31A2, the SCK (serial clock) terminal 31A3, the PWR (power) terminal 31A4, and the SIO (data) terminal 31A1 are arrayed in the first direction in this order.

Further, for example, the four electrical contact surfaces 31A are arrayed in the first direction such that the GND (ground) terminal 31A2, the PWR (power) terminal 31A4, the SIO (data) terminal 31A1, and the SCK (serial clock) terminal 31A3 are arrayed in the first direction in this order.

Further, for example, the four electrical contact surfaces 31A are arrayed in the first direction such that the GND (ground) terminal 31A2, the PWR (power) terminal 31A4, the SCK (serial clock) terminal 31A3, and the SIO (data) terminal 31A1 are arrayed in the first direction in this order.

Further, for example, the four electrical contact surfaces 31A are arrayed in the first direction such that the SCK (serial clock) terminal 31A3, the SIO (data) terminal 31A1, the GND (ground) terminal 31A2, and the PWR (power) terminal 31A4 are arrayed in the first direction in this order.

Further, for example, the four electrical contact surfaces 31A are arrayed in the first direction such that the SCK (serial clock) terminal 31A3, the SIO (data) terminal 31A1, the PWR (power) terminal 31A4, and the GND (ground) terminal 31A2 are arrayed in the first direction in this order.

Further, for example, the four electrical contact surfaces 31A are arrayed in the first direction such that the SCK (serial clock) terminal 31A3, the GND (ground) terminal 31A2, the SIO (data) terminal 31A1, and the PWR (power) terminal 31A4 are arrayed in the first direction in this order.

Further, for example, the four electrical contact surfaces 31A are arrayed in the first direction such that the SCK (serial clock) terminal 31A3, the GND (ground) terminal 31A2, the PWR (power) terminal 31A4, and the SIO (data) terminal 31A1 are arrayed in the first direction in this order.

Further, for example, the four electrical contact surfaces 31A are arrayed in the first direction such that the SCK (serial clock) terminal 31A3, the PWR (power) terminal 31A4, the SIO (data) terminal 31A1, and the GND (ground) terminal 31A2 are arrayed in the first direction in this order.

Further, for example, the four electrical contact surfaces 31A are arrayed in the first direction such that the SCK (serial clock) terminal 31A3, the PWR (power) terminal 31A4, the GND (ground) terminal 31A2, and the SIO (data) terminal 31A1 are arrayed in the first direction in this order.

Further, for example, the four electrical contact surfaces 31A are arrayed in the first direction such that the PWR (power) terminal 31A4, the SIO (data) terminal 31A1, the GND (ground) terminal 31A2, and the SCK (serial clock) terminal 31A3 are arrayed in the first direction in this order.

Further, for example, the four electrical contact surfaces 31A are arrayed in the first direction such that the PWR (power) terminal 31A4, the SIO (data) terminal 31A1, the SCK (serial clock) terminal 31A3, and the GND (ground) terminal 31A2 are arrayed in the first direction in this order.

Further, for example, the four electrical contact surfaces 31A are arrayed in the first direction such that the PWR (power) terminal 31A4, the GND (ground) terminal 31A2, the SIO (data) terminal 31A1, and the SCK (serial clock) terminal 31A3 are arrayed in the first direction in this order.

Further, for example, the four electrical contact surfaces 31A are arrayed in the first direction such that the PWR (power) terminal 31A4, the GND (ground) terminal 31A2, the SCK (serial clock) terminal 31A3, and the SIO (data) terminal 31A1 are arrayed in the first direction in this order.

Further, for example, the four electrical contact surfaces 31A are arrayed in the first direction such that the PWR (power) terminal 31A4, the SCK (serial clock) terminal 31A3, the SIO (data) terminal 31A1, and the GND (ground) terminal 31A2 are arrayed in the first direction in this order.

Further, for example, the four electrical contact surfaces 31A are arrayed in the first direction such that the PWR (power) terminal 31A4, the SCK (serial clock) terminal 31A3, the GND (ground) terminal 31A2, and the SIO (data) terminal 31A1 are arrayed in the first direction in this order.

The plurality of electrical contact surfaces 31A is positioned at the one end portion of the casing 3 in the third direction. Specifically, the plurality of electrical contact surfaces 31A is positioned at the fifth end portion 3C of the casing 3. More specifically, the storage medium 31 including the plurality of electrical contact surfaces 31A is positioned at an outer surface of the fifth end portion 3C of the casing 3.

The fifth end portion 3C of the casing 3 is positioned closer to the plurality of electrical contact surfaces 31A than the sixth end portion 3D of the casing 3 is to the plurality of electrical contact surfaces 31A. That is, the outer surface of the fifth end portion 3C of the casing 3 is positioned closer to the storage medium 31 including the plurality of electrical contact surfaces 31A than an outer surface of the sixth end portion 3D of the casing 3 is to the storage medium 31.

The plurality of electrical contact surfaces 31A is also positioned at the one end portion of the casing 3 in the first direction. That is, the plurality of electrical contact surfaces 31A is positioned at the first end portion 3E of the casing 3. Specifically, the plurality of electrical contact surfaces 31A is positioned at an outer surface of the gear cover 11. More specifically, the plurality of electrical contact surfaces 31A is positioned at an outer surface of one end portion of the gear cover 11 in the third direction. In other words, the plurality of electrical contact surfaces 31A is positioned at an outer surface of the casing 3 via the gear cover 11. Specifically, the plurality of electrical contact surfaces 31A is positioned at the outer surface of the first end portion 3E of the casing 3 via the gear cover 11. Note that the storage medium 31 having the plurality of electrical contact surfaces 31A is fixed to the outer surface of the gear cover 11 with adhesive. Thus, the gear cover 11 includes the plurality of electrical contact surfaces 31A.

The gear cover 11 further includes a protrusion 33. Hence, the developing cartridge 1 includes the protrusion 33. In a case where the developing cartridge 1 is attached to the drum frame 45 described later (see FIG. 8), the protrusion 33 is fitted into a first opening 47 (described later) of the drum frame 45 (see FIG. 8). Fitting the protrusion 33 into the first opening 47 fixes the position of the developing cartridge 1 relative to the drum cartridge 41. The protrusion 33 is aligned with the plurality of electrical contact surfaces 31A in the second direction. That is, the plurality of electrical contact surfaces 31A is aligned with the protrusion 33 in the second direction. The protrusion 33 is positioned closer to the developing roller 2 than the plurality of electrical contact surfaces 31A is to the developing roller 2 in the second direction.

2.3.2 Plurality of Ribs 32

Figure 8:
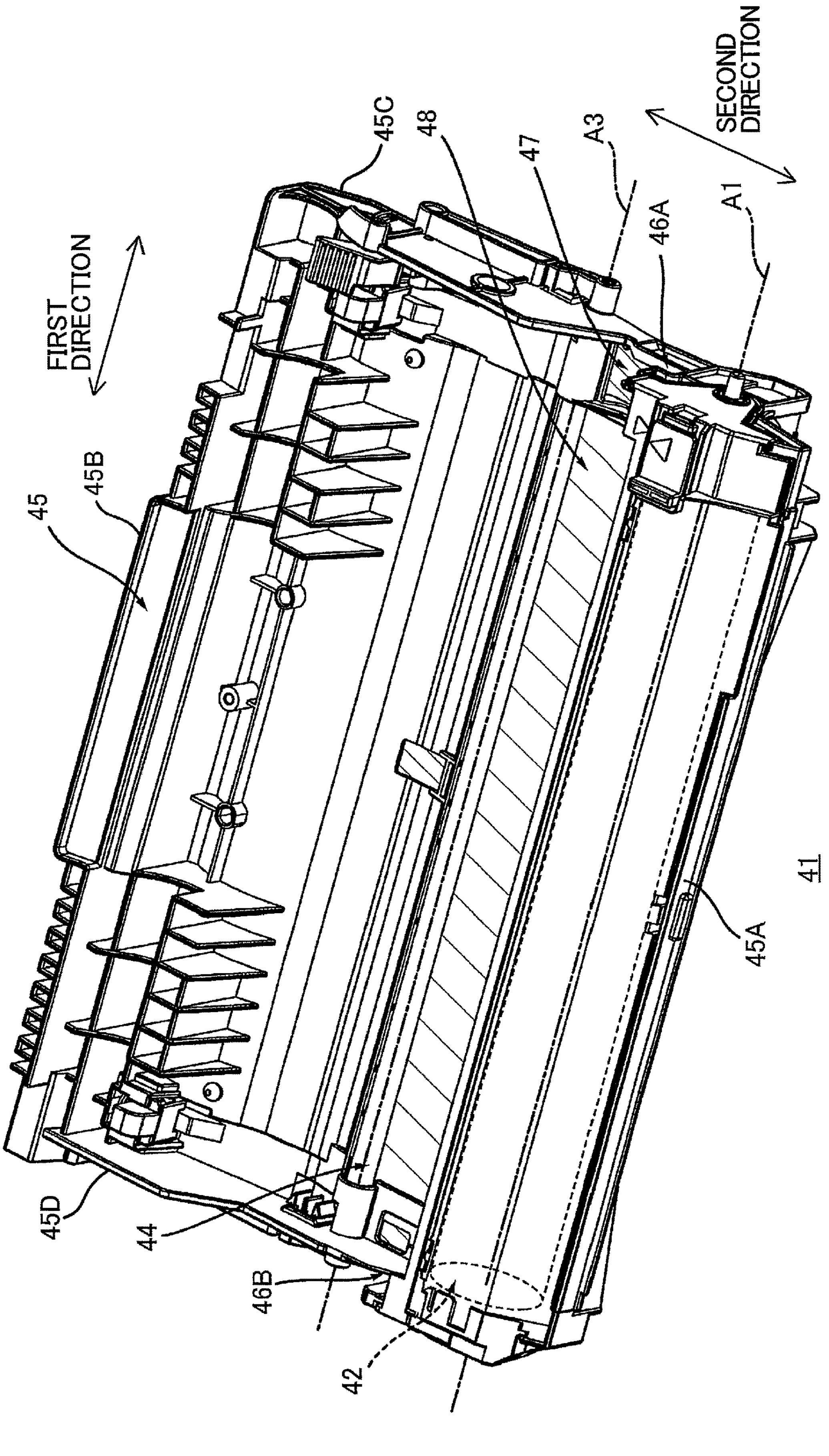
FIG. 8 is a perspective view of a drum cartridge to which a developing cartridge is not attached, in which a first opening and a second opening are illustrated.
Figure 9:
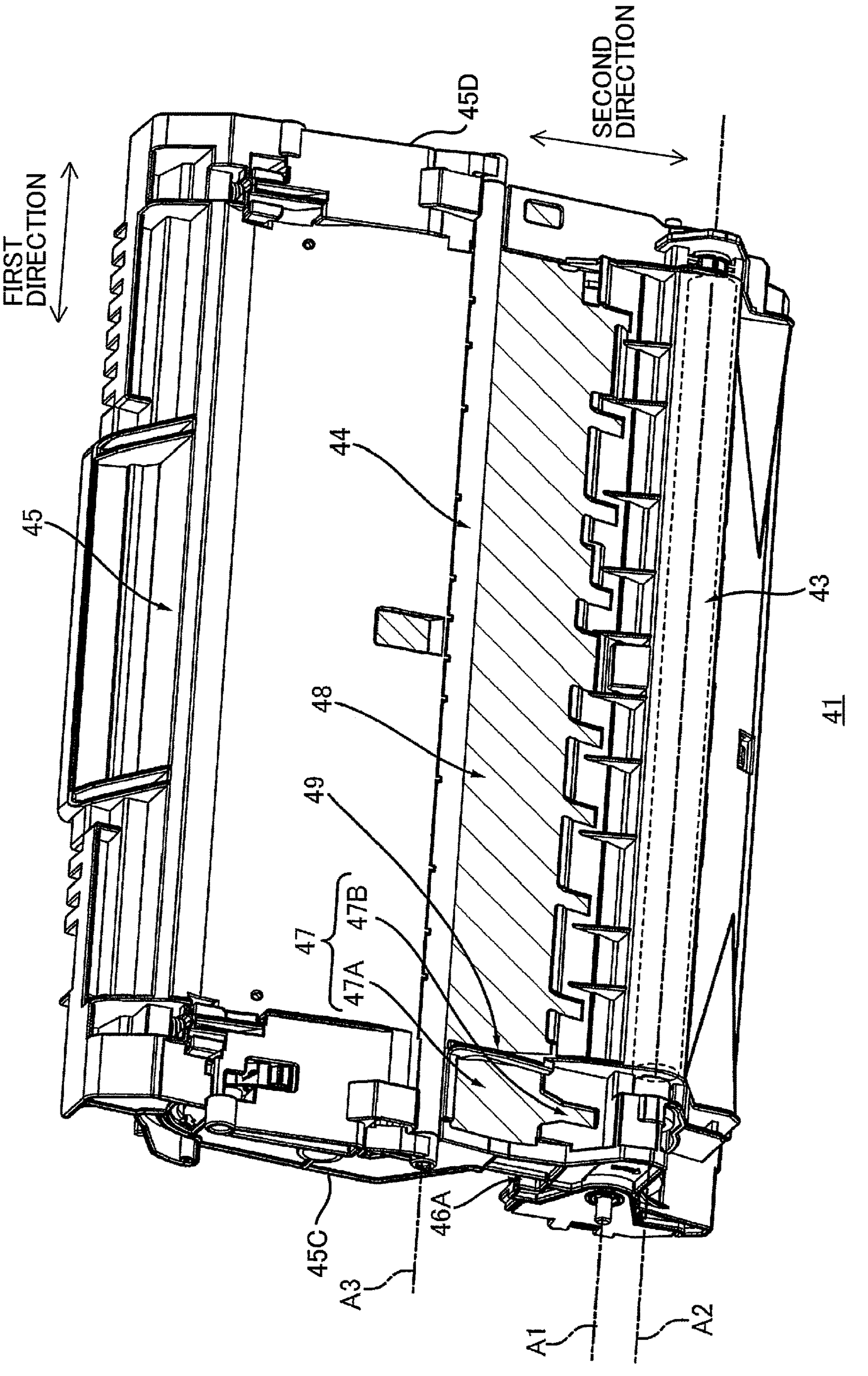
FIG. 9 is a perspective view of the drum cartridge in FIG. 8, as viewed in a direction different from FIG. 8.

The plurality of ribs 32 (see FIGS. 6 and 11) is positioned to be capable of contacting sheets of paper conveyed by a conveying roller 44 described later (see FIGS. 8 and 9). Through this contact with the sheets of paper, the plurality of ribs 32 guides the sheets of paper to a position between the photosensitive drum 42 and a transfer roller 43 described later while reducing an area of contact between the casing 3 and the sheets of paper.

The plurality of ribs 32 each protrudes outward from the outer surface of the casing 3 in the third direction. Specifically, the plurality of ribs 32 each protrudes outward from the second frame 7 of the casing 3 in the third direction. Hence, the second frame 7 includes the plurality of ribs 32. Each of the plurality of ribs 32 extends in the second direction.

The plurality of ribs 32 is aligned with each other in the first direction. Specifically, the plurality of ribs 32 is arranged at intervals in the first direction. The plurality of ribs 32 is also aligned with the plurality of electrical contact surfaces 31A in the first direction. The plurality of ribs 32 is aligned with the plurality of electrical contact surfaces 31A and at least a portion of the developing electrode 21 in the first direction. Further, the plurality of ribs 32 is aligned with the plurality of electrical contact surfaces 31A and at least a portion of the supply electrode 22 in the first direction. Further, a dimension L5 in the first direction of a set of the plurality of ribs 32 is greater than a dimension in the first direction of the sheets of paper conveyed by the conveying roller 44. The dimension L5 in the first direction of a set of the plurality of ribs 32 is shorter than a dimension in the first direction of the developing-roller body 2A. The dimension L5 in the first direction of a set of the plurality of ribs 32 is greater than a dimension L6 in the first direction of a set of the plurality of electrical contact surfaces 31A.

2.4 Positional Relationships of Electrical Contact Surfaces 31A, Developing Roller 2, Agitator 5, Developing Electrode 21, and Supply Electrode 22

Next, the positional relationships of the plurality of electrical contact surfaces 31A, the developing roller 2, the agitator 5, the developing electrode 21, and the supply electrode 22 will be described with reference to FIG. 5.

The plurality of electrical contact surfaces 31A is positioned between the developing roller 2 and the agitator 5 in the second direction. Specifically, the plurality of electrical contact surfaces 31A is positioned between the developing-roller axis A4 and the agitator axis A5 in the second direction.

The plurality of electrical contact surfaces 31A is disposed at a position corresponding to both the developing electrode 21 and the supply electrode 22 in the third direction. In other words, when projected in the first direction, the plurality of electrical contact surfaces 31A is disposed at a position overlapping both the developing electrode 21 and the supply electrode 22 in the third direction. Specifically, the plurality of electrical contact surfaces 31A is aligned with the developing electrode 21 and the supply electrode 22 in the third direction when viewed in the first direction. That is, when projected in the first direction, the plurality of electrical contact surfaces 31A is aligned in the third direction with a first end portion of the developing electrode 21 in the second direction. In other words, the plurality of electrical contact surfaces 31A is aligned in the third direction with at least a portion of the developing electrode 21 when viewed in the first direction. Further, when projected in the first direction, the plurality of electrical contact surfaces 31A is aligned in the third direction with at least a portion of the supply electrode 22. That is, the plurality of electrical contact surfaces 31A is disposed at a position corresponding to both the developing contact surface 21A and the supply contact surface 22A in the third direction when viewed in the first direction.

3. Overall Structure of Drum Cartridge 41

Next, the structure of the drum cartridge 41 will be described with reference to FIGS. 8 and 9. The drum cartridge 41 includes the photosensitive drum 42, the transfer roller 43, the conveying roller 44, and the drum frame 45.

3.1 Photosensitive Drum 42

The photosensitive drum 42 is positioned at a first end portion 45A of the drum frame 45 in the second direction. The photosensitive drum 42 is rotatable about a first axis A1 extending in the first direction. An electrostatic latent image is formed on the surface of the photosensitive drum 42 during an image forming operation.

3.2 Transfer Roller 43

The transfer roller 43 can transfer a toner image from the surface of the photosensitive drum 42 onto a sheet of paper. The transfer roller 43 is rotatable about a second axis A2 extending in the first direction. The transfer roller 43 contacts the surface of the photosensitive drum 42.

3.3 Conveying Roller 44

The conveying roller 44 is a roller for conveying sheets of paper to a position between the photosensitive drum 42 and the transfer roller 43. The conveying roller 44 is rotatable about a third axis A3 extending in the first direction. The conveying roller 44 is separated from the transfer roller 43 in the second direction.

3.4 Drum Frame 45

The drum frame 45 has the first end portion 45A and a second end portion 45B in the second direction. The first end portion 45A of the drum frame 45 is positioned closer to the photosensitive drum 42 than the second end portion 45B of the drum frame 45 is to the photosensitive drum 42 in the second direction.

Both end portions of the drum frame 45 in the first direction are respectively provided with guides 46A and 46B. The end portions of the developing-roller shaft 2B in the first direction are fitted into the corresponding guides 46A and 46B in a case where the developing cartridge 1 is attached to the drum frame 45. More specifically, one end portion 45C of the drum frame 45 in the first direction has the guide 46A in which the first end portion of the developing-roller shaft 2B in the first direction is fitted, and another end portion 45D of the drum frame 45 in the first direction has the guide 46B in which the second end portion of the developing-roller shaft 2B in the first direction is fitted. The drum frame 45 also has the first opening 47, and a second opening 48. The drum frame 45 further includes a guide frame 49.

3.4.1 First Opening 47

The first opening 47 serves both to expose the plurality of electrical contact surfaces 31A to the outside of the drum frame 45 and to receive the protrusion 33 in a fitted state in a case where the developing cartridge 1 is attached to the drum frame 45. In this way, the plurality of electrical contact surfaces 31A is in contact with electrodes of the image forming apparatus through the first opening 47 in a case where the developing cartridge 1 is attached to the image forming apparatus. The first opening 47 will be described later in detail with reference to FIGS. 10 and 11.

3.4.2 Second Opening 48

The second opening 48 allows sheets of paper conveyed by the conveying roller 44 to pass therethrough and to direct the sheets of paper to the area of contact between the photosensitive drum 42 and the transfer roller 43. More specifically, the second opening 48 exposes the plurality of ribs 32 to the outside of the drum frame 45 in a case where the developing cartridge 1 is attached to the drum frame 45. Accordingly, in a case where the developing cartridge 1 is attached to the image forming apparatus, a sheet of paper conveyed by the conveying roller 44 contacts the plurality of ribs 32 exposed through the second opening 48. The conveyed sheet subsequently passes through the second opening 48 toward the area of contact between the photosensitive drum 42 and the transfer roller 43. The second opening 48 will be described later in detail with reference to FIGS. 10 and 11.

3.4.3 Guide Frame 49

The guide frame 49 can guide the sheets of paper conveyed by the conveying roller 44. The guide frame 49 will also be described later in detail with reference to FIGS. 10 and 11.

3.5 Attached State of Developing Cartridge 1 to Drum Cartridge 41

Next, the positions and functions of the first opening 47, the second opening 48, and the guide frame 49 in a case where the developing cartridge 1 is attached to the drum frame 45 will be described with reference to FIGS. 10 and 11.

First, an operation for attaching the developing cartridge 1 to the drum frame 45 will be described. The developing cartridge 1 is attached to the drum cartridge 41 by pivotally moving the developing cartridge 1 relative to the drum cartridge 41 about the developing-roller shaft 2B. Specifically, in order to attach the developing cartridge 1 to the drum frame 45, the both end portions of the developing-roller shaft 2B are fitted in the corresponding guides 46A and 46B of the drum frame 45 (see FIGS. 8 and 9). From this state, the developing cartridge 1 is pivotally moved about the developing-roller shaft 2B relative to the drum cartridge 41. Through this action, the drum frame 45 faces the second frame 7 of the developing cartridge 1 in the third direction, at which time the developing cartridge 1 is fixed in position relative to the drum frame 45. This completes the operation for attaching the developing cartridge 1 to the drum frame 45.

In this state, the plurality of electrical contact surfaces 31A is exposed to the outside of the drum frame 45 through the first opening 47. That is, the plurality of electrical contact surfaces 31A is exposed to the outside of the drum frame 45 through the first opening 47 in a case where the developing cartridge 1 is attached to the drum frame 45. Specifically, the plurality of electrical contact surfaces 31A is exposed to the outside of the drum frame 45 through the first opening 47 in a case where the developing cartridge 1 is pivotally moved relative to the drum frame 45 about the developing-roller shaft 2B and attached to the drum frame 45.

Next, the drum cartridge 41 and the developing cartridge 1 are attached together into the image forming apparatus. Since the image forming apparatus has a plurality of electrodes, each of the plurality of electrical contact surfaces 31A contacts corresponding one of the plurality of electrodes in the image forming apparatus. Thus, the number of electrodes in the image forming apparatus is equal to the number of electrical contact surfaces 31A. Since the storage medium 31 of the developing cartridge 1 has four electrical contact surfaces 31A in the present embodiment, the image forming apparatus has four electrodes.

Figure 11:
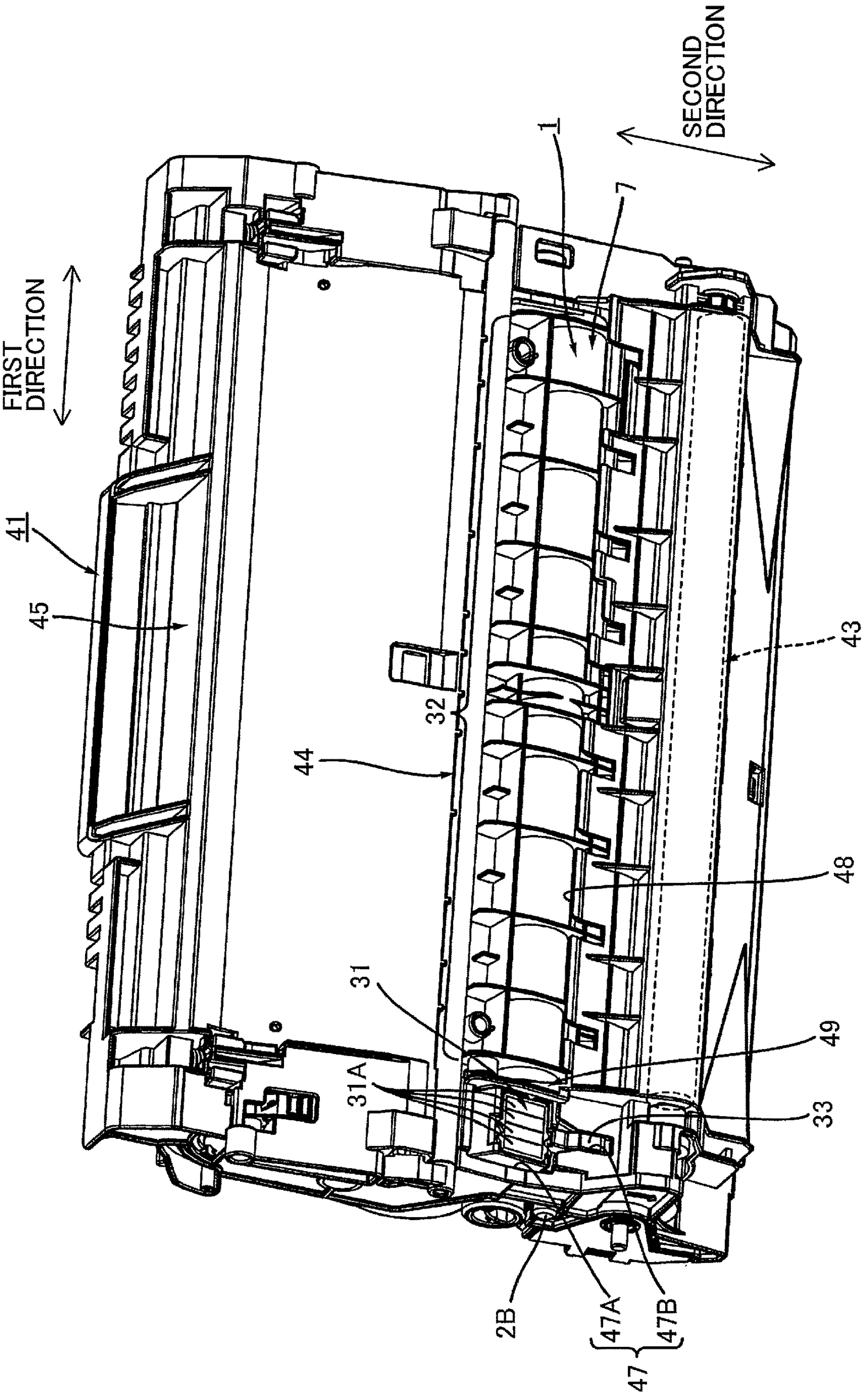
FIG. 11 is a perspective view of the drum cartridge in FIG. 9, as viewed in a direction different from FIG. 10.

As illustrated in FIG. 11, the first opening 47 is positioned between the transfer roller 43 and the conveying roller 44 in the second direction. The first opening 47 is positioned at the one end portion 45C of the drum frame 45 in the first direction. A dimension of the first opening 47 in the first direction is greater than the dimension L6 of a set of the four electrical contact surfaces 31A in the first direction. The first opening 47 has a first region 47A, and a second region 47B.

The first region 47A of the first opening 47 exposes the plurality of electrical contact surfaces 31A to the outside of the drum frame 45 in a case where the developing cartridge 1 is attached to the drum cartridge 41. Thus, a dimension of the first region 47A in the first direction is greater than the dimension L6 of a set of the four electrical contact surfaces 31A in the first direction. The protrusion 33 of the developing cartridge 1 (see FIG. 6) is fitted into the second region 47B in a case where the developing cartridge 1 is attached to the drum frame 45. The second region 47B is aligned with the first region 47A in the second direction. The second region 47B is positioned opposite to the conveying roller 44 with respect to the first region 47A in the second direction. A dimension of the second region 47B in the first direction is smaller than the dimension of the first region 47A in the first direction.

The second opening 48 is positioned between the transfer roller 43 and the conveying roller 44 in the second direction. The second opening 48 is aligned with the first opening 47 in the first direction. A dimension of the second opening 48 in the first direction is greater than the dimension L5 of a set of the plurality of ribs 32 in the first direction. The dimension of the second opening 48 in the first direction is approximately equal to a dimension of the transfer roller 43 in the first direction.

The guide frame 49 is positioned between the first opening 47 and the second opening 48 in the first direction. The guide frame 49 extends in the second direction. Note that the guide frame 49 also functions as a reinforcing frame for strengthening the drum frame 45. In other words, the drum frame 45 includes a reinforcing frame. The reinforcing frame is positioned between the first opening 47 and the second opening 48 in the first direction.

4. Operational Advantages

The drum cartridge 41 according to the embodiment has the first opening 47 for exposing the plurality of electrical contact surfaces 31A, as illustrated in FIGS. 8 through 11.

With this configuration, the plurality of electrical contact surfaces 31A can be exposed to the outside of the drum cartridge 41 through the first opening 47 in a case where the developing cartridge 1 is attached to the drum frame 45.

Further, the first opening 47 is positioned between the transfer roller 43 and the conveying roller 44. Hence, the first opening 47 is positioned in proximity to the photosensitive drum 42. Specifically, the first opening 47 is disposed at a position close to the developing roller 2 in case where the developing cartridge 1 is attached to the drum frame 45. In other words, the plurality of electrical contact surfaces 31A is positioned close to the developing roller 2 in case where the developing cartridge 1 is attached to the drum frame 45.

Hence, this arrangement reduces the distance between the developing roller 2 and the plurality of electrical contact surfaces 31A, and specifically reduces the tolerance for the distance between the developing roller 2 and the plurality of electrical contact surfaces 31A.

Thus, variations in the position of the plurality of electrical contact surfaces 31A produced when manufacturing the developing cartridge 1 can be decreased, for example, thereby suppressing variations in the position of the plurality of electrical contact surfaces 31A relative to the drum frame 45 in case where the developing cartridge 1 is attached to the drum frame 45. More specifically, this configuration can suppress variations in the position of the plurality of electrical contact surfaces 31A relative to the drum frame 45 in case where the developing cartridge 1 is attached to the drum frame 45 by first fitting the end portions of the developing roller 2 into the end portions of the drum frame 45 and subsequently pivotally moving the developing cartridge 1 relative to the drum frame 45 about the developing roller 2.

Figure 5:
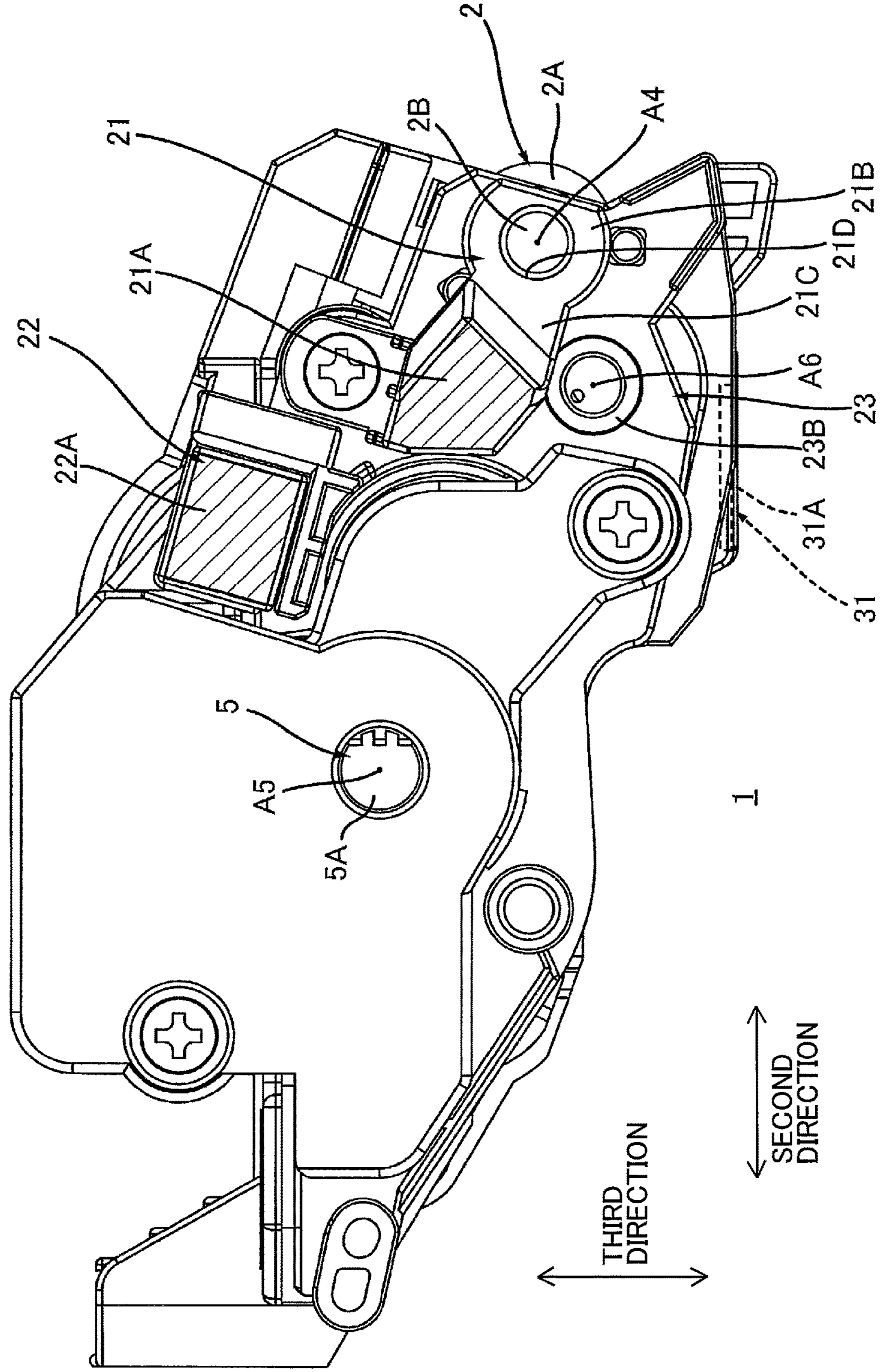
FIG. 5 is a side view of the developing cartridge in FIG. 4, in which a developing-roller bearing, a developing electrode, a supply-roller bearing, and a supply electrode are illustrated.

In the developing cartridge 1 according to the embodiment, the plurality of electrical contact surfaces 31A is positioned between the developing roller 2 and the agitator 5 in the second direction, as illustrated in FIG. 5. Hence, in a case where the developing cartridge 1 is attached to the drum frame 45, the plurality of electrical contact surfaces 31A is positioned in proximity to the developing roller 2.

Accordingly, this arrangement reduces the distance between the developing roller 2 and the plurality of electrical contact surfaces 31A, and specifically reduces the tolerance for the distance between the developing roller 2 and the plurality of electrical contact surfaces 31A.

Thus, variations in the position of the plurality of electrical contact surfaces 31A produced when manufacturing the developing cartridge 1 can be decreased, for example, thereby suppressing variations in the position of the plurality of electrical contact surfaces 31A relative to the drum frame 45 in a case where the developing cartridge 1 is attached to the drum frame 45. More preferably, this configuration can suppress variations in the position of the plurality of electrical contact surfaces 31A relative to the drum frame 45 in a case where the developing cartridge 1 is attached to the drum frame 45 by first fitting the end portions of the developing roller 2 into the end portions of the drum frame 45 and subsequently pivotally moving the developing cartridge 1 relative to the drum frame 45 about the developing roller 2.

Further, the plurality of electrical contact surfaces 31A is positioned at the first end portion 3E of the casing 3 in the first direction, while the developing electrode 21 and the supply electrode 22 are positioned at the second end portion 3F of the casing 3 in the first direction.

This arrangement prevents the electric power supplied to the developing electrode 21 and the supply electrode 22 from being transmitted to the plurality of electrical contact surfaces 31A.

Accordingly, this configuration suppresses malfunctions in the storage medium 31 that may be caused by electric power supplied to the developing electrode 21 and the supply electrode 22 being transmitted to the storage medium 31.

Further, the plurality of ribs 32 is aligned with the plurality of electrical contact surfaces 31A in the first direction.

Therefore, the plurality of electrical contact surfaces 31A is positioned outside the sheets of paper being conveyed by the conveying roller 44.

This arrangement prevents the plurality of electrical contact surfaces 31A from interfering with the sheets of paper conveyed by the conveying roller 44.

Further, a portion of the developing cartridge 1 between the developing roller 2 and the agitator 5 is exposed to the outside of the drum frame 45 through the second opening 48 of the drum cartridge 41 in a case where the developing cartridge 1 is attached to the drum cartridge 41. Here, the plurality of electrical contact surfaces 31A is positioned between the developing roller 2 and the agitator 5 in the second direction, but is positioned outside the portion between the developing roller 2 and the agitator 5 in the first direction. The sheets of paper being conveyed by the conveying roller 44 pass through the second opening 48 of the drum cartridge 41. The sheets of paper being conveyed by the conveying roller 44 pass through between the photosensitive drum 42 and the transfer roller 43.

As described above, the plurality of electrical contact surfaces 31A is positioned between the developing roller 2 and the agitator 5 in the second direction and outside the portion between the developing roller 2 and the agitator 5 in the first direction. This arrangement enables the plurality of electrical contact surfaces 31A to contact electrodes in the image forming apparatus while not interfering with the conveyance of sheets of paper when the conveying roller 44 conveys sheets of paper to the position between the photosensitive drum 42 and transfer roller 43.

5. Modifications

Next, modifications of the embodiment will be described with reference to FIGS. 12A through 13C.

5.1 First Modification

Figure 12B:
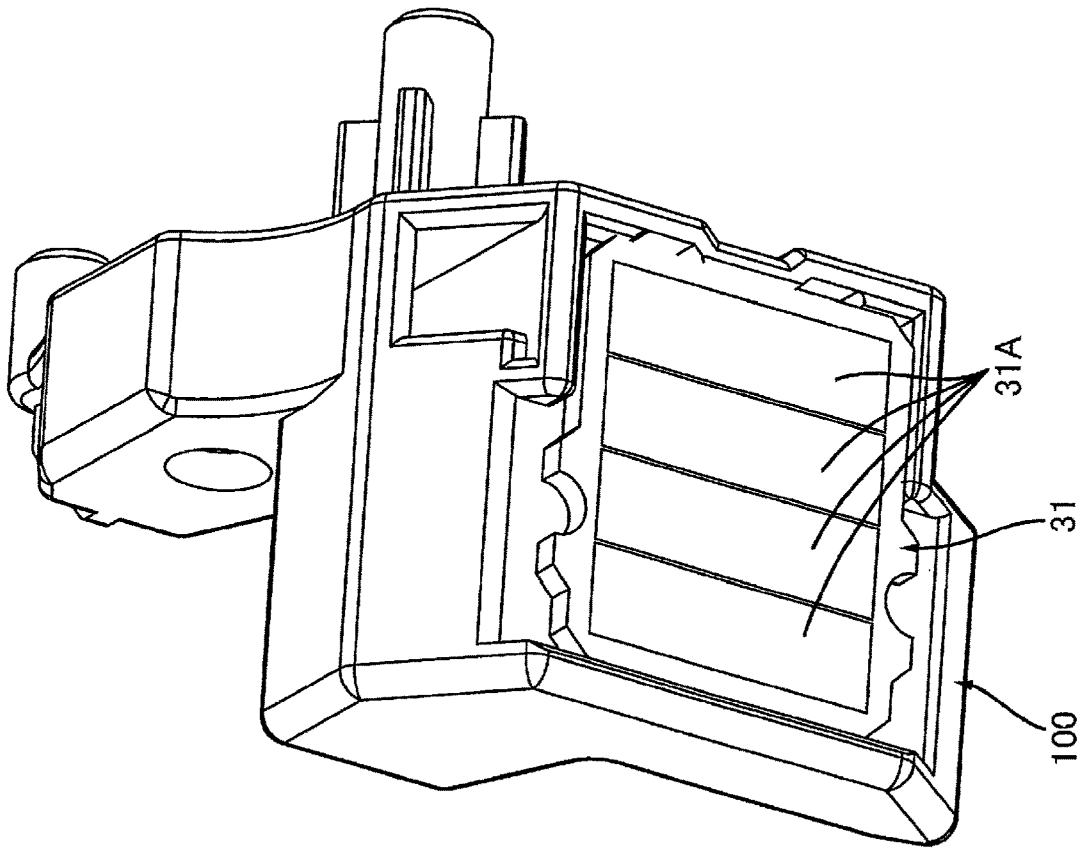
FIG. 12B is an enlarged perspective view of the attachment member according to the first modification.
Figure 12A:
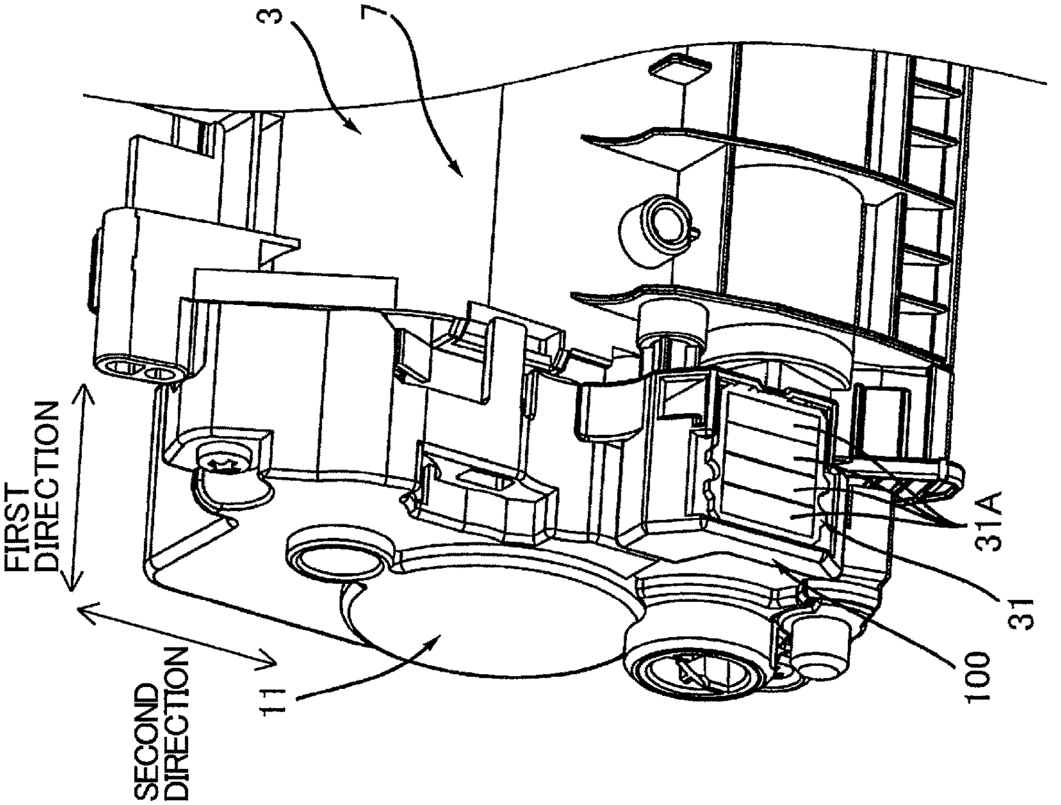
FIG. 12A is a perspective view of one end portion of a developing cartridge according to a first modification, in which the storage medium having the plurality of electrical contact surfaces is attached to a gear cover through an attachment member.

First modification will be described while referring to FIGS. 12A and 12B, wherein like parts and components to those in the embodiment are designated with the same reference numerals to avoid duplicating description.

The storage medium 31 having the plurality of electrical contact surfaces 31A may not necessarily be fixed to the outer surface of the gear cover 11 with adhesive. Instead, the storage medium 31 having the plurality of electrical contact surfaces 31A may be fixed to an outer surface of an attachment member 100 with adhesive and may be subsequently attached to the outer surface of the gear cover 11 through the attachment member 100, as illustrated in FIGS. 12A and 12B. The attachment member 100 is a separate member from the gear cover 11. Hence, the storage medium 31 having the plurality of electrical contact surfaces 31A can be replaced by replacing the attachment member 100 supporting the storage medium 31 having the electrical contact surfaces 31A rather than replacing the entire gear cover 11.

Alternatively, the attachment member 100 may be attached to the outer surface of the casing 3 rather than the gear cover 11.

5.2 Second Modification

Figure 13A:
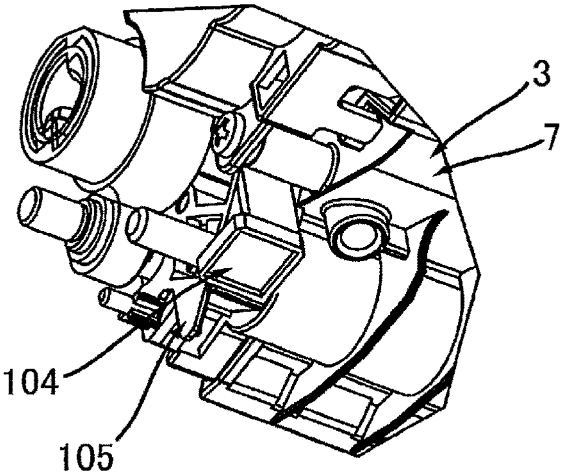
FIG. 13A is a perspective view of one end portion of a developing cartridge according to a second modification.

Second modification will be described while referring to FIG. 13A, wherein like parts and components to those in the embodiment are designated with the same reference numerals to avoid duplicating description.

The storage medium 31 having the plurality of electrical contact surfaces 31A may be supported at the casing 3 instead of being fixed to the outer surface of the gear cover 11 with adhesive. Specifically, the casing 3 may include the plurality of electrical contact surfaces 31A. As illustrated in FIG. 13A, the casing 3 includes an attachment portion 104 to which the storage medium 31 having the plurality of electrical contact surfaces 31A is attached.

In addition, the developing cartridge 1 may include a protrusion 105 in place of the protrusion 33. The protrusion 105 protrudes from the casing 3.

5.3 Third Modification

Figure 13B:
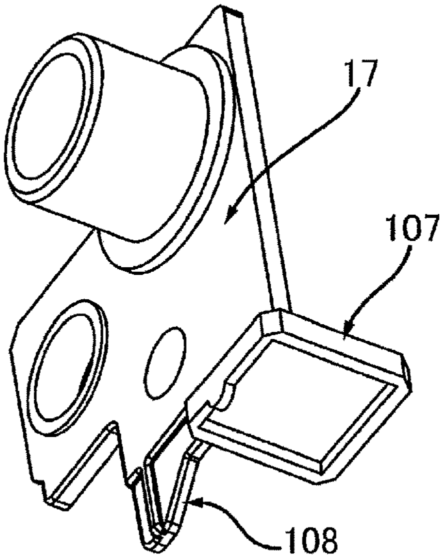
FIG. 13B is a perspective view of a first bearing member of a developing cartridge according to a third modification.

Third modification will be described while referring to FIG. 13B, wherein like parts and components to those in the embodiment are designated with the same reference numerals to avoid duplicating description.

The storage medium 31 having the plurality of electrical contact surfaces 31A may be supported at the first bearing member 17 instead of being fixed to the outer surface of the gear cover 11 with adhesive. Specifically, the first bearing member 17 may include the plurality of electrical contact surfaces 31A. As illustrated in FIG. 13B, the first bearing member 17 includes an attachment portion 107. The storage medium 31 having the plurality of electrical contact surfaces 31A is attached to the attachment portion 107.

In addition, the developing cartridge 1 may include a protrusion 108 in place of the protrusion 33. The protrusion 108 protrudes from the first bearing member 17. In other words, the first bearing member 17 may include the protrusion 108.

5.4 Fourth Modification

Figure 13C:
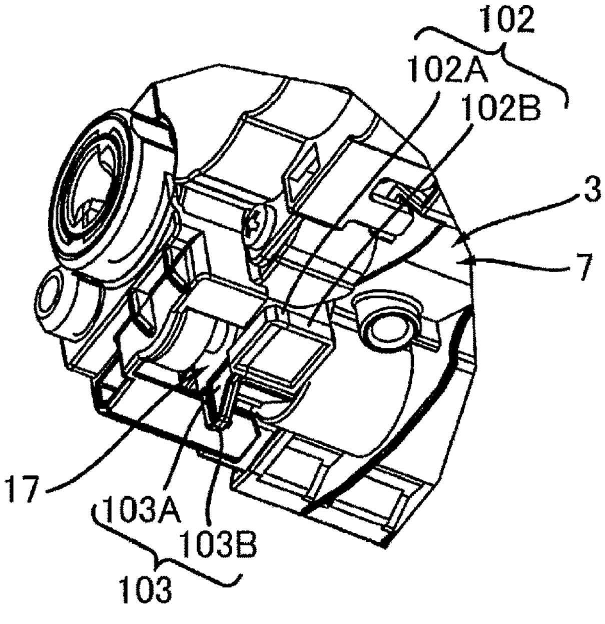
FIG. 13C is a perspective view of one end portion of a developing cartridge according to a fourth modification.

Fourth modification will be described while referring to FIG. 13C, wherein like parts and components to those in the embodiment are designated with the same reference numerals to avoid duplicating description.

The storage medium 31 having the plurality of electrical contact surfaces 31A may be supported by both the first bearing member 17 and the casing 3 instead of being fixed to the outer surface of the gear cover 11 with adhesive. Specifically, the first bearing member 17 may include a first attachment portion 102A, as illustrated in FIG. 13C. Further, the casing 3 may include a second attachment portion 102B. The first attachment portion 102A and the second attachment portion 102B are connected to each other in the first direction. Together the first attachment portion 102A and the second attachment portion 102B constitute an attachment portion 102. The storage medium 31 having the plurality of electrical contact surfaces 31A is attached to both the first attachment portion 102A and the second attachment portion 102B, i.e., the attachment portion 102.

In addition, the developing cartridge 1 may include a protrusion 103 in place of the protrusion 33. The protrusion 103 includes a first protrusion 103A protruding from the first bearing member 17, and a second protrusion 103B protruding from the casing 3.

5.5 Fifth Modification

In a fifth modification, the guide frame 49 may be eliminated from the drum frame 45. Specifically, the first opening 47 may be in communication with the second opening 48. More specifically, the first opening 47 may include the second opening 48.

6. Dimensions of Storage Medium 31

Figure 14:
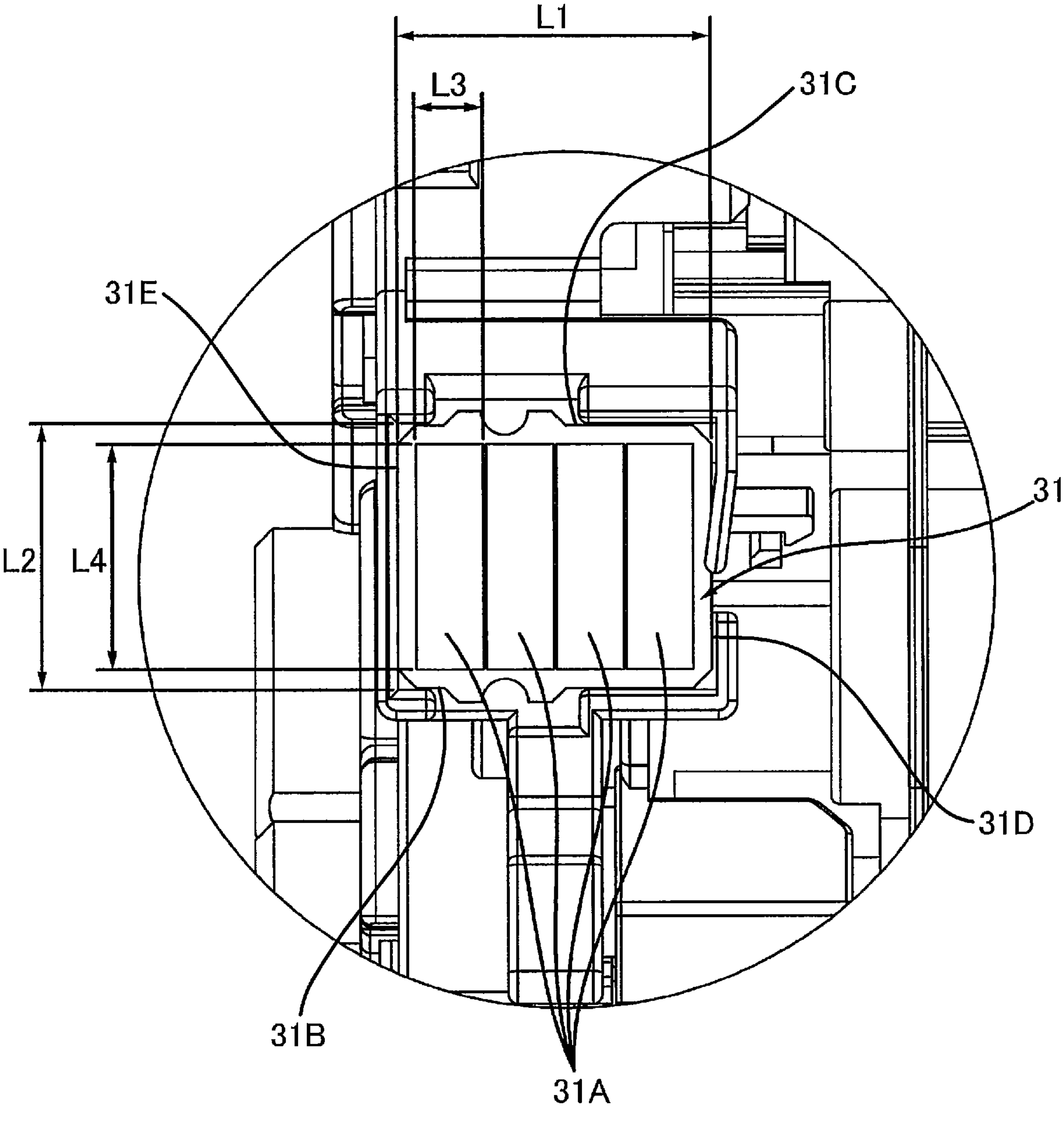
FIG. 14 is an explanatory view for explaining dimensions of the storage medium having the plurality of electrical contact surfaces.

Next, the dimensions of the storage medium 31 will be described in detail with reference to FIG. 14. The following dimensions of the storage medium 31 may be applied to the embodiment and any of the modifications described above.

A length L1 of the storage medium 31 in the first direction is 16.85 mm.

A length L2 of the storage medium 31 in the second direction is 14 mm. Note that, as illustrated in FIG. 14, the length L2 is a length in the second direction of the storage medium 31 excluding projecting portions of the storage medium 31.

A length L3 of each of the plurality of electrical contact surfaces 31A in the first direction is 3.6 mm.

A length L4 of each of the plurality of electrical contact surfaces 31A in the second direction is 12 mm.

The four electrical contact surfaces 31A are arranged at intervals of 0.15 mm in the first direction.

7. Positioning of Electrical Contact Surfaces 31

Next, the positioning of the plurality of electrical contact surfaces 31A will be described in detail with reference to FIGS. 15 through 18. Note that the following positioning of the plurality of electrical contact surfaces 31A may be applied to the embodiment and any of the modifications described above.

Figure 15:
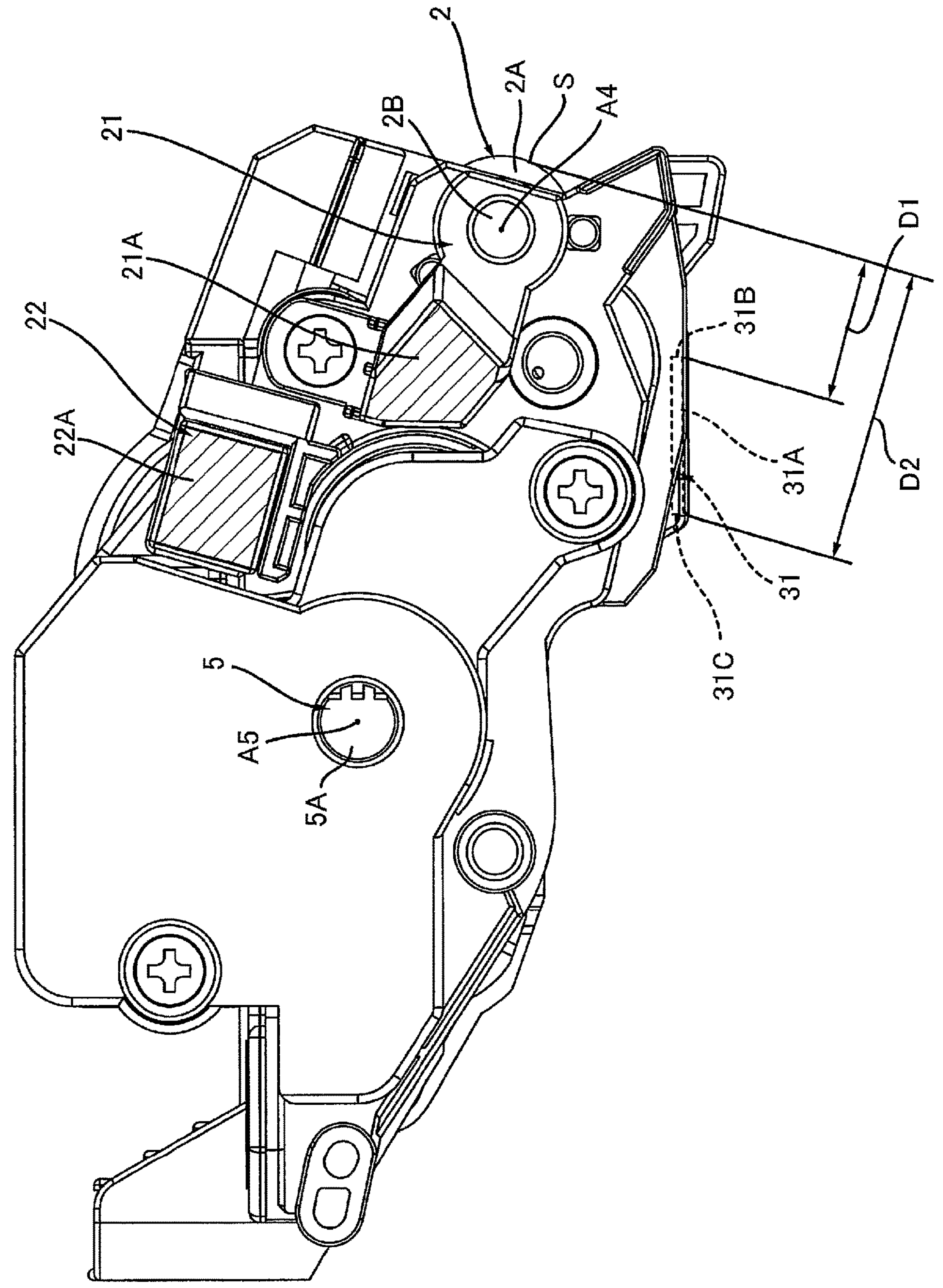
FIG. 15 is an explanatory view for explaining a position of the plurality of electrical contact surfaces in a second direction with reference to a surface of a developing roller.

As illustrated in FIG. 15, a distance in the second direction from a set of the plurality of electrical contact surfaces 31A to a surface S of the developing roller 2 may be in a range from 11 mm to 26 mm. In other words, at least a portion of the plurality of electrical contact surfaces 31A is positioned within a range from 11 mm to 26 mm from the surface S of the developing roller 2 in the second direction. That is, at least a portion of the plurality of electrical contact surfaces 31A is distant from the surface S of the developing roller 2 in the second direction by a distance ranging from 11 mm to 26 mm. Note that the surface S of the developing roller 2 denotes a portion on the circumferential surface of the developing roller 2 that is separated farthest from the agitator axis A5.

More specifically, the storage medium 31 has a first edge 31B and a second edge 31C in the second direction. The second edge 31C is separated from the first edge 31B in the second direction. The second edge 31C is positioned between the agitator gear 15 and the first edge 31B in the second direction. A distance D1 in the second direction between the first edge 31B of the storage medium 31 and the surface S of the developing roller 2 is 11.924 mm. A distance D2 in the second direction between the second edge 31C of the storage medium 31 and the surface S of the developing roller 2 is 25.355 mm. An outer diameter of the developing roller 2 is 13 mm.

In this case, the plurality of electrical contact surfaces 31A in its entirety is positioned within the range from 11 mm to 26 mm from the surface S of the developing roller 2 in the second direction.

Figure 16:
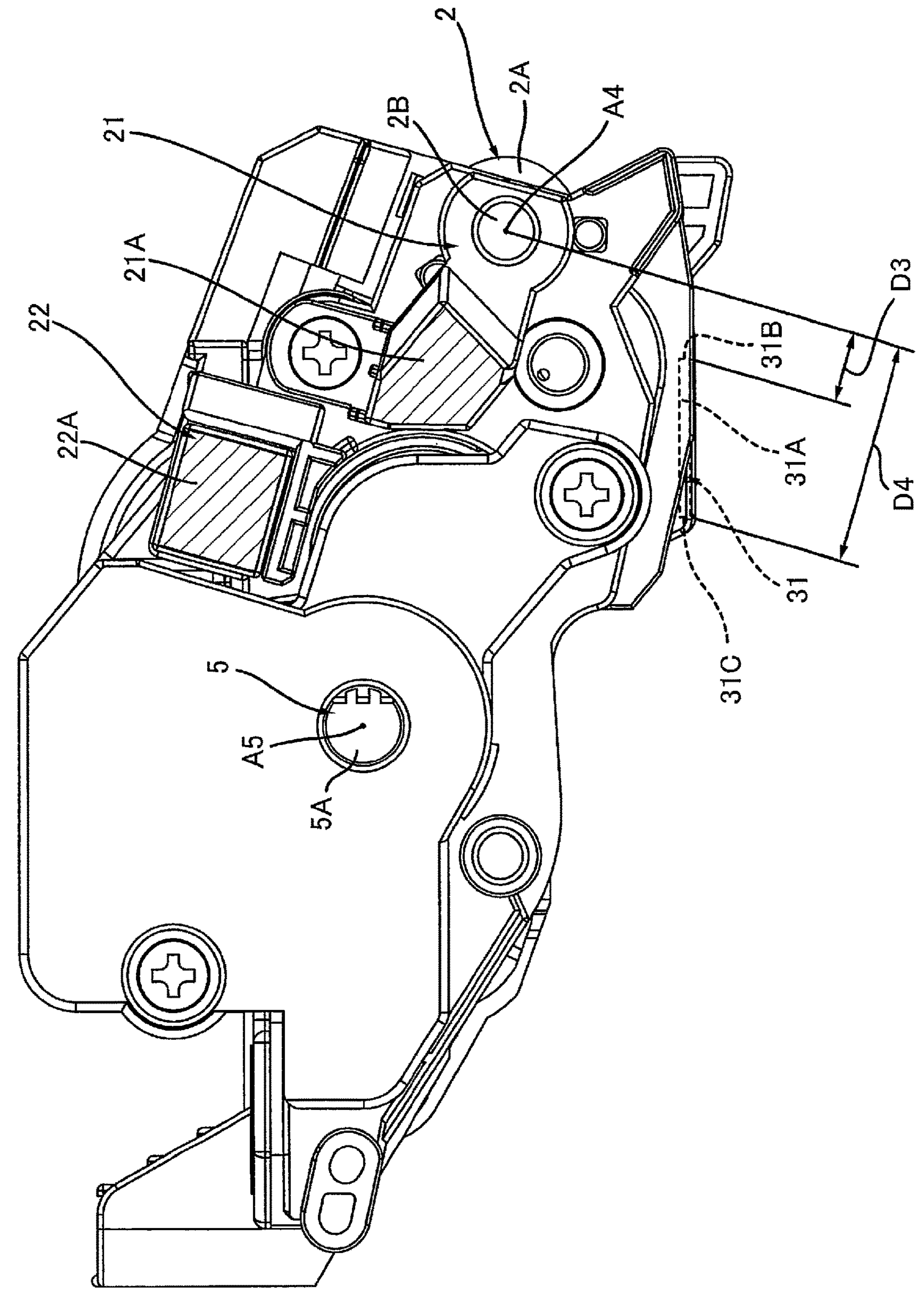
FIG. 16 is an explanatory view for explaining a position of the plurality of electrical contact surfaces in the second direction with reference to a developing-roller axis.

Further, a distance in the second direction from a set of the plurality of electrical contact surfaces 31A to the developing-roller axis A4 may be in a range from 5 mm to 19 mm, as illustrated in FIG. 16. In other words, at least a portion of the plurality of electrical contact surfaces 31A is positioned within a range from 5 mm to 19 mm from the developing-roller axis A4 in the second direction. That is, at least a portion of the plurality of electrical contact surfaces 31A is distant from the developing-roller axis A4 in the second direction by a distance ranging from 5 mm to 19 mm.

More specifically, a distance D3 in the second direction between the first edge 31B of the storage medium 31 and the developing-roller axis A4 is 5.424 mm. A distance D4 in the second direction between the second edge 31C of the storage medium 31 and the developing-roller axis A4 is 18.855 mm.

In this case, the plurality of electrical contact surfaces 31A in its entirety is positioned within the range from 5 mm to 19 mm from the developing-roller axis A4 in the second direction.

Figure 17:
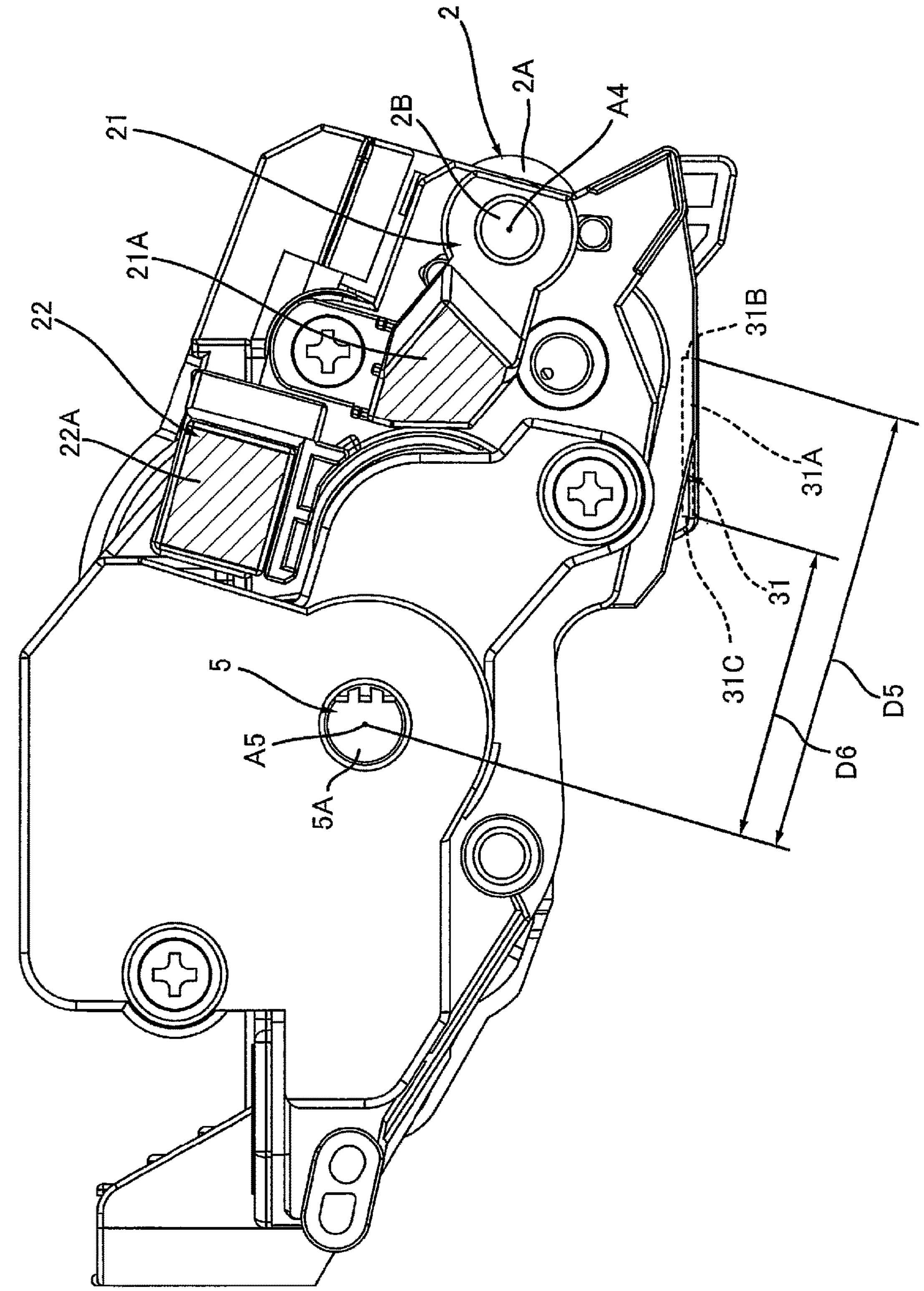
FIG. 17 is an explanatory view for explaining a position of the plurality of electrical contact surfaces in the second direction with reference to an agitator axis.

Further, a distance in the second direction from a set of the plurality of electrical contact surfaces 31A to the agitator axis A5 may be in a range from 26 mm to 40 mm, as illustrated in FIG. 17. In other words, at least a portion of the plurality of electrical contact surfaces 31A is positioned within a range from 26 mm to 40 mm from the agitator axis A5 in the second direction. That is, at least a portion of the plurality of electrical contact surfaces 31A is distant from the agitator axis A5 in the second direction by a distance ranging from 26 mm to 40 mm.

More specifically, a distance D5 in the second direction between the first edge 31B of the storage medium 31 and the agitator axis A5 is 39.515 mm. Further, a distance D6 in the second direction between the second edge 31C of the storage medium 31 and the agitator axis A5 is 26.084 mm.

In this case, the plurality of electrical contact surfaces 31A in its entirety is positioned within the range from 26 mm to 40 mm from the agitator axis A5 in the second direction.

Figure 18:
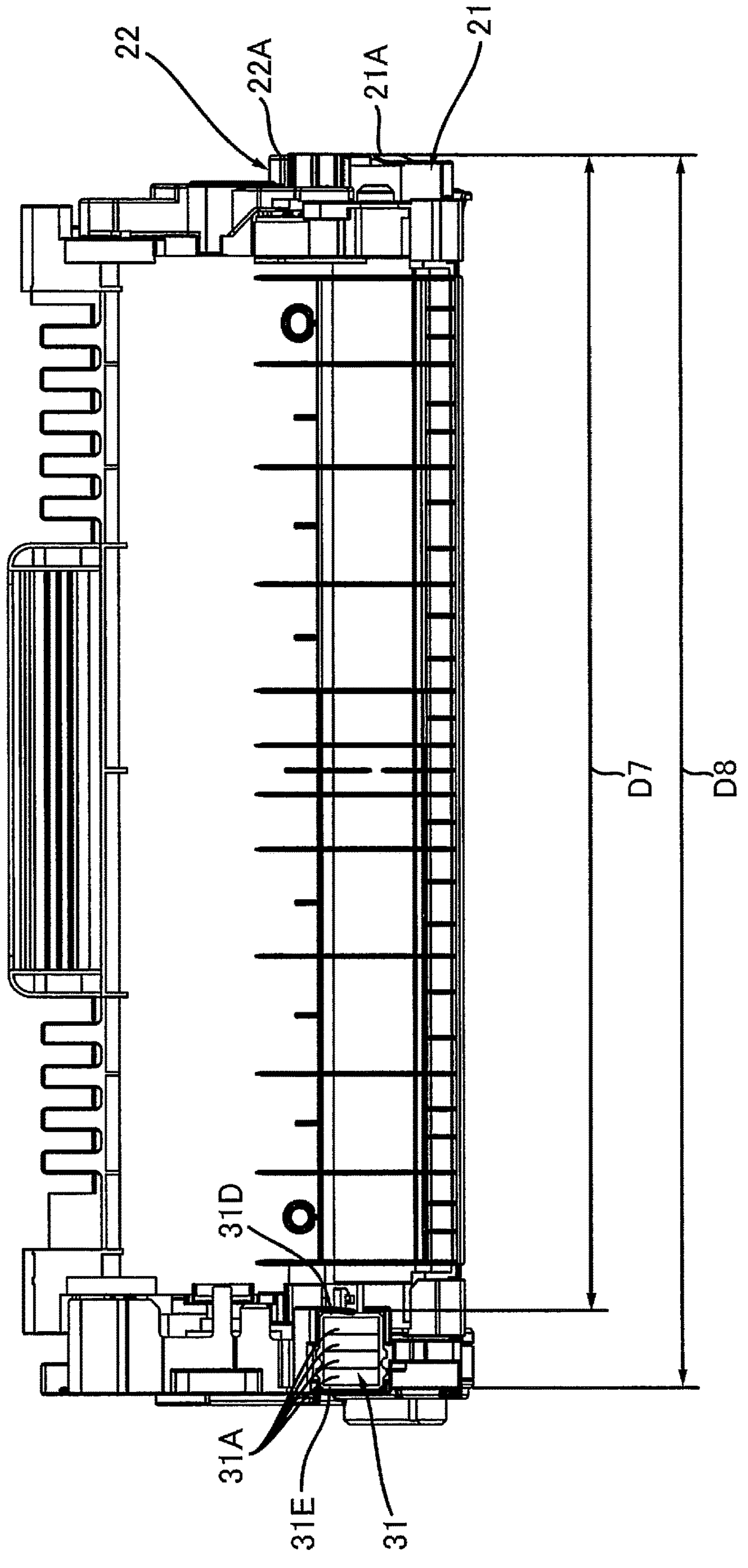
FIG. 18 is an explanatory view for explaining a position of the plurality of electrical contact surfaces in a first direction with reference to a developing contact surface of the developing electrode and a supply contact surface of the supply electrode.

Further, a distance in the first direction from a set of the plurality of electrical contact surfaces 31A to the developing contact surface 21A may be in a range from 226 mm to 244 mm, as illustrated in FIG. 18. In other words, at least a portion of the plurality of electrical contact surfaces 31A is positioned within a range from 226 mm to 244 mm from the developing contact surface 21A in the first direction. That is, at least a portion of the plurality of electrical contact surfaces 31A is distant from the developing contact surface 21A in the first direction by a distance ranging from 226 mm to 244 mm.

More specifically, the storage medium 31 has a first end 31D and a second end 31E in the first direction. The second end 31E is separated from the first end 31D in the first direction. The second end 31E is positioned opposite to the developing contact surface 21A with respect to the first end 31D in the first direction. A distance D7 in the first direction between the first end 31D of the storage medium 31 and the developing contact surface 21A is 226.25 mm. Further, a distance D8 in the first direction between the second end 31E of the storage medium 31 and the developing contact surface 21A is 243.10 mm.

In this case, the plurality of electrical contact surfaces 31A in its entirety is positioned within the range from 226 mm to 244 mm from the developing contact surface 21A in the first direction.

Further, a distance in the first direction from a set of the plurality of electrical contact surfaces 31A to the supply contact surface 22A may be in a range from 226 mm to 244 mm. In other words, at least a portion of the plurality of electrical contact surfaces 31A is positioned within a range from 226 mm to 244 mm from the supply contact surface 22A in the first direction. That is, at least a portion of the plurality of electrical contact surfaces 31A is distant from the supply contact surface 22A in the first direction by a distance ranging from 226 mm to 244 mm.

More specifically, a distance in the first direction between the first end 31D of the storage medium 31 and the supply contact surface 22A is 226.25 mm, which is identical to the distance D7 between the first end 31D of the storage medium 31 and the developing contact surface 21A. Further, a distance in the first direction between the second end 31E of the storage medium 31 and the supply contact surface 22A is 243.10 mm, which is identical to the distance D8 between the second end 31E of the storage medium 31 and the developing contact surface 21A.

In this case, the plurality of electrical contact surfaces 31A in its entirety is positioned within the range from 226 mm to 244 mm from the supply contact surface 22A in the first direction.

While the description has been made in detail with reference to the embodiments thereof, it would be apparent to those skilled in the art that many modifications and variations may be made therein without departing from the spirit of the disclosure.

What is claimed is:

1. A developing cartridge comprising:

a casing configured to accommodate toner therein, the casing having a first side and a second side being spaced apart from the first side in a first direction, the casing having a third side and a fourth side being spaced apart from the third side in a second direction, the casing having an upper surface facing upward and a lower surface facing downward;

a developing roller rotatable about a developing roller axis extending in the first direction, the developing roller being positioned at the third side of the casing;

a coupling rotatable about a couple axis extending in the first direction, the coupling being positioned at the first side of the casing, an agitator rotatable about an agitator axis extending in the first direction, the agitator including an agitator shaft extending in the first direction, the agitator shaft being spaced apart from the coupling in the second direction, and a storage medium having an electrical contact surface, the electrical contact surface being positioned at the lower surface of the casing, the electrical contact surface facing downward, the electrical contact surface being closer to the first side of the casing than the second side of the casing is to the first side of the casing in the first direction, the electrical contact surface being closer to the third side of the casing than the fourth side of the casing is to the third side of the casing in the second direction, wherein the electrical contact surface is closer to the developing roller than the agitator shaft is to the developing roller in the second direction.

2. The developing cartridge according to claim 1, further comprising:

an electrode being positioned at the second side of the casing, and a conductive path that extends from the electrode to the first side of the casing in the first direction.

3. The developing cartridge according to claim 2, wherein the developing roller includes a developing roller shaft extending in the first direction, and wherein the electrical contact surface is closer to the developing roller shaft than the agitator shaft is to the developing shaft in the second direction.

4. The developing cartridge according to claim 2, wherein the electrode is made of an electrically conductive resin.

5. The developing cartridge according to claim 1, further comprising:

an agitator gear rotatable with the agitator shaft, the agitator gear being positioned at the first side of the casing, and a cover covering at least a portion of the first side of the casing, the cover being positioned at the one first of the casing, the cover covering at least a portion of a circumference of the agitator gear, wherein the electrical contact surface is positioned at the cover.

6. The developing cartridge according to claim 5, further comprising:

a developing gear rotatable with the developing roller, the developing gear being positioned at the first side of the casing.

7. The developing cartridge according to claim 6, wherein the cover covers at least a portion of a circumference of the developing gear.

8. The developing cartridge according to claim 5, wherein the electrical contact surface is positioned at an outer surface of the cover.

9. The developing cartridge according to claim 1, wherein the developing cartridge is for use with a drum cartridge including a photosensitive drum.

10. The developing cartridge according to claim 9, wherein the developing cartridge is configured to be attached to the drum cartridge.

11. The developing cartridge according to claim 1, wherein the storage medium is positioned at the lower surface of the casing.

12. The developing cartridge according to claim 1, wherein the storage medium includes a memory configured to store information of the developing cartridge, the memory being positioned at the lower surface of the casing.

13. The developing cartridge according to claim 1, further comprising:

a handle positioned at the fourth side of the casing.

14. The developing cartridge according to claim 13, wherein the electrical contact surface is positioned between the developing roller and the handle in the second direction, and wherein the electrical contact surface is closer to the developing roller than the handle is to the developing roller in the second direction.

15. The developing cartridge according to claim 1, further comprising:

a supply roller rotatable about a supply roller axis extending in the first direction, and wherein the electrical contact surface is closer to the supply roller than the agitator shaft is to the supply roller in the second direction.

16. The developing cartridge according to claim 1, wherein the casing includes a plurality of ribs, the plurality of ribs being positioned at the lower surface of the casing, and wherein the plurality of ribs are positioned closer to the second side of the casing in the first direction than the electrical contact surface of the storage medium is to the second side of the casing in the first direction.

* * * * *